(12) United States Patent
Park et al.

(10) Patent No.: US 10,942,546 B2
(45) Date of Patent: *Mar. 9, 2021

(54) ELECTRONIC DEVICE AND METHOD FOR PROCESSING GESTURE THEREOF

(71) Applicant: Samsung Electronics Co., Ltd., Suwon-si (KR)

(72) Inventors: Jeong-rok Park, Hwaseong-si (KR); Kang-min Lee, Seongnam-si (KR); Dong-churl Kim, Ansan-si (KR); Jae-young Huh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

This patent is subject to a terminal disclaimer.

(21) Appl. No.: 16/393,479

(22) Filed: Apr. 24, 2019

(65) Prior Publication Data

US 2019/0250671 A1    Aug. 15, 2019

Related U.S. Application Data

(63) Continuation of application No. 15/196,847, filed on Jun. 29, 2016, now Pat. No. 10,317,947.

(30) Foreign Application Priority Data

Oct. 12, 2015    (KR) .................... 10-2015-0142440
Oct. 28, 2015    (KR) .................... 10-2015-0150344

(51) Int. Cl.
*G06F 1/16*    (2006.01)
*G06F 3/01*    (2006.01)
(Continued)

(52) U.S. Cl.
CPC .......... *G06F 1/1652* (2013.01); *G06F 1/1626* (2013.01); *G06F 1/1641* (2013.01);
(Continued)

(58) Field of Classification Search
CPC ..................................................... G06F 1/1652
See application file for complete search history.

(56) References Cited

U.S. PATENT DOCUMENTS 8,806,382 B2    8/2014    Matsuda
8,842,077 B2    9/2014    Chuang
(Continued)

FOREIGN PATENT DOCUMENTS

CN    102073406 A    5/2011
CN    102200882 A    9/2011
(Continued)

OTHER PUBLICATIONS

European Search Report dated Sep. 24, 2018, issued in European Patent Application No. 16855692.6.
(Continued)

*Primary Examiner* — Gustavo Polo
(74) *Attorney, Agent, or Firm* — Jefferson IP Law, LLP

(57) ABSTRACT

A method of an electronic device for processing gesture is provided. The method includes, in response to an input of a hovering gesture to a flexible display of the electronic device, wherein the flexible display is divided in response to folding of the electronic device into a first area and a second area based on a folding line, sensing the hovering gesture in the first area and the second area, respectively, and determining a hovering point corresponding to the hovering gesture, based on the sensed positions of the first area and the second area, respectively. Accordingly, a hovering gesture can be detected with increased accuracy.

12 Claims, 31 Drawing Sheets

(51) Int. Cl.
*G06F 3/0488* (2013.01)
*G06F 3/041* (2006.01)
*G06F 3/0484* (2013.01)
*G06F 3/044* (2006.01)

(52) U.S. Cl.
CPC ............ *G06F 1/1694* (2013.01); *G06F 3/017* (2013.01); *G06F 3/0416* (2013.01); *G06F 3/0446* (2019.05); *G06F 3/04842* (2013.01); *G06F 3/04883* (2013.01); *G06F 3/04886* (2013.01); *G06F 2203/04102* (2013.01); *G06F 2203/04108* (2013.01)

(56) References Cited

U.S. PATENT DOCUMENTS

| | | | |
|---|---|---|---|
| 9,411,415 | B2 | 8/2016 | Jeong et al. |
| 2010/0117975 | A1 | 5/2010 | Cho |
| 2010/0171708 | A1 | 7/2010 | Chuang |
| 2011/0237303 | A1 | 9/2011 | Matsuda |
| 2014/0043263 | A1 | 2/2014 | Park et al. |
| 2014/0101560 | A1 | 4/2014 | Kwak et al. |
| 2014/0168070 | A1 | 6/2014 | Jeong et al. |
| 2015/0015525 | A1 | 1/2015 | Cho et al. |
| 2015/0062028 | A1 | 3/2015 | Go et al. |
| 2015/0103043 | A1 | 4/2015 | Hills et al. |
| 2015/0153778 | A1 | 6/2015 | Jung |
| 2015/0220299 | A1 | 8/2015 | Kim et al. |

FOREIGN PATENT DOCUMENTS

| | | |
|---|---|---|
| CN | 102298419 A | 12/2011 |
| CN | 102646016 A | 8/2012 |
| CN | 103154866 A | 6/2013 |
| CN | 103294369 A | 9/2013 |
| CN | 103309592 A | 9/2013 |
| CN | 103870773 A | 6/2014 |
| EP | 2 905 693 A1 | 8/2015 |
| FR | 3 003 964 A1 | 10/2014 |
| TW | 201027163 A | 7/2010 |
| TW | 201415343 A | 4/2014 |
| TW | I486867 B | 6/2015 |
| WO | 2012/027088 A2 | 3/2012 |

OTHER PUBLICATIONS

Indian Search Report dated Aug. 28, 2020, issued in Indian Application No. 201817016746.
Chinese Office Action dated Jun. 24, 2020, issued in Chinese Application No. 201680059549.5.
European Office Action dated Dec. 10, 2020, issued in European Application No. 20194457.6-1206.

| HOVERING DISTANCE | 1 | 2 | 3 | 4 | 5 | 6 | 7 |
|---|---|---|---|---|---|---|---|
| 701 — 0mm H | 0.016345 | 0.034162 | 0.043927 | 0.125 | 0.044145 | 0.033891 | 0.016353 |
| 702 — 3mm H | 0.019041 | 0.027142 | 0.023369 | 0.02191 | 0.023517 | 0.027679 | 0.019366 |
| 703 — 5mm H | 0.018674 | 0.021191 | 0.017436 | 0.016057 | 0.017567 | 0.021841 | 0.019098 |
| 704 — 10mm H | 0.013406 | 0.010627 | 0.013299 | 0.013203 | 0.01347 | 0.01164 | 0.014022 |

| | | |
|---|---|---|
| HORIZONTAL ELECTRODE 1 | | OFF |
| HORIZONTAL ELECTRODE 2 | | ON |
| HORIZONTAL ELECTRODE 3 | | OFF |
| HORIZONTAL ELECTRODE 4 | | ON — FOLDING AXIS |
| HORIZONTAL ELECTRODE 5 | | OFF |
| HORIZONTAL ELECTRODE 6 | | ON |
| HORIZONTAL ELECTRODE 7 | | OFF |

FIG. 15A        FIG. 15B
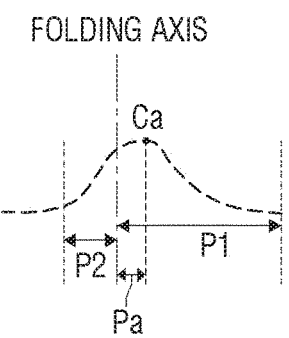 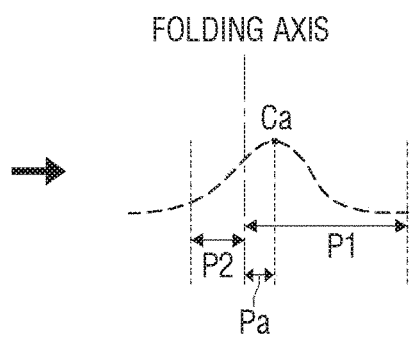
FIG. 15C    FIG. 15D    FIG. 15E
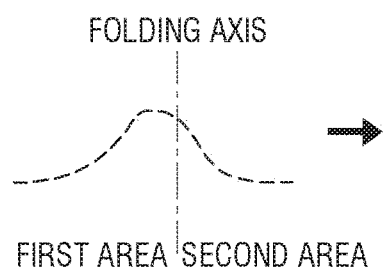 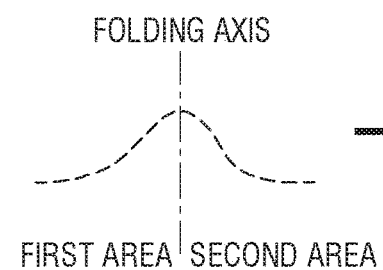 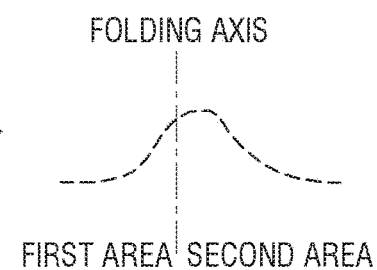

FIG. 23A  FIG. 23B
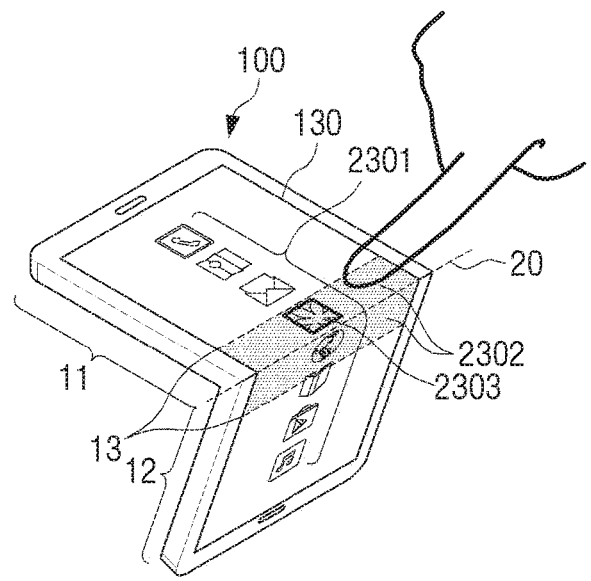
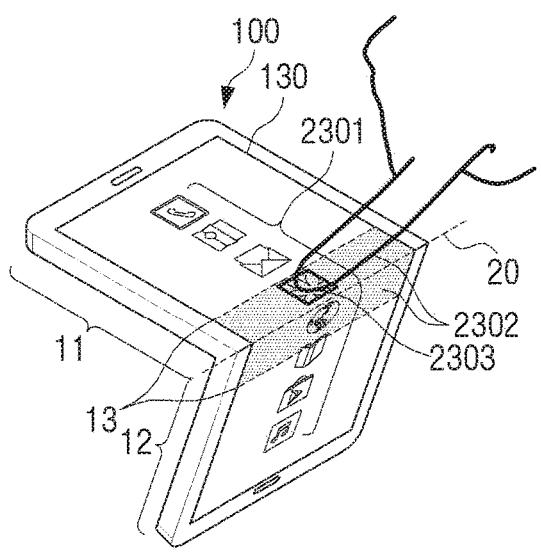
FIG. 23C
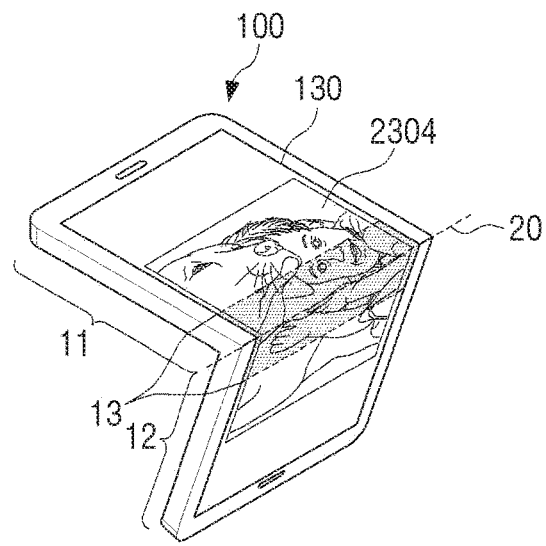

(a)

ELECTRONIC DEVICE AND METHOD FOR PROCESSING GESTURE THEREOF

CROSS-REFERENCE TO RELATED APPLICATION(S)

This application is a continuation application of prior application Ser. No. 15/196,847, filed on Jun. 29, 2016 which was based on and claimed priority under 35 U.S.C. § 119(a) of Korean patent applications number 10-2015-00142440, filed on Oct. 12, 2015, and 10-2015-0150344, filed on Oct. 28, 2015, in the Korean Intellectual Property Office, the disclosure of each of which is incorporated by reference herein in its entirety.

TECHNICAL FIELD

The present disclosure relates to an electronic device and a method for processing gesture thereof. More particularly, the present disclosure relates to an electronic device configured to process hovering gesture at a flexible display and a method for processing the gesture thereof

BACKGROUND

Advancement in the display technology has enabled development of a flexible display, a transparent display, and the like. A flexible display is a display apparatus that can be bent.

The flexible display is imparted with flexibility that allows folding and unfolding, as the glass substrate covering the liquid crystal in the related liquid crystal display (LCD) and organic light emitting diode (OLED) is replaced with a plastic film. The flexible display has advantages, such as bendability or foldability, and the ability to be formed into a variety of forms.

For example, the flexible display may be applied to a portable phone that allows the display of the portable phone to be folded and rolled, an information technology (IT) product such as micro size personal computer (PC), and an electronic book that can substitute the publications such as magazines, textbooks, books, and comic books. In addition, because the flexible display uses flexible plastic substrate, the use thereof can be extended to fields such as clothing and the medical diagnostic devices.

Along with commercialization of the flexible display, various interfaces are developed in the foldable or rollable electronic devices, by using the bending or folding properties of the flexible display.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device including a flexible display, and a method for processing hovering gesture on a flexible display, and more particularly, on a folding area of the flexible display at which the flexible display is folded. In accordance with an aspect of the present disclosure, a method of an electronic device for processing a gesture is provided. The method includes, in response to an input of a hovering gesture to a flexible display of the electronic device, wherein the flexible display is divided in response to folding of the electronic device into a first area and a second area based on a folding line, sensing the hovering gesture in the first area and the second area, respectively, and determining a hovering point corresponding to the hovering gesture, based on the sensed positions of the first area and the second area, respectively.

In accordance with another aspect of the present disclosure, a method of an electronic device for processing a gesture is provided. The method includes, in response to an input of a hovering gesture on a folding area comprising a folding line of the electronic device in a folding state, sensing at least one hovering position in the folding area, and correcting the sensed hovering position to determine a hovering point in the folding area corresponding to the hovering gesture.

In accordance with another aspect of the present disclosure, a method of an electronic device for processing a gesture is provided. The method includes, in response to an input of a hovering gesture on a folding area comprising a folding line of the electronic device in a folding state, sensing at least one hovering position in the folding area, and adjusting the sensed hovering position to determine, in the folding area, a hovering point corresponding to the hovering gesture, and displaying a user interface (UI) on the determined hovering point.

In accordance with another aspect of the present disclosure, a method of an electronic device for processing a gesture is provided. The method includes sensing a plurality of hovering positions on the folding area comprising a folding line while the electronic device is in a folding state, adjusting the plurality of hovering positions to determine a plurality of hovering points, and determining a moving direction of the hovering gesture on the folding area, based on the plurality of determined hovering points.

In accordance with another aspect of the present disclosure, a method of an electronic device for processing a gesture is provided. The method includes sensing a hovering gesture using an input unit on a folding area comprising a folding line while the electronic device is in a folding state, and determining a moving direction of the hovering gesture, based on a motion characteristic of the input unit.

In accordance with another aspect of the present disclosure, an electronic device is provided. The electronic device includes a flexible display dividable into a first area and a second area based on a folding line, and a processor configured to, in response to an input of a hovering gesture with the flexible display being in a folding state, determine a hovering point corresponding to the hovering gesture based on a first position sensed in the first area, and a second position sensed in the second area.

In accordance with another aspect of the present disclosure, an electronic device is provided. The electronic device includes a flexible display bendable with reference to a folding line, and a processor configured to, in response to an input of a hovering gesture on a folding area comprising the folding line, adjust at least one hovering position sensed in the folding area to determine a hovering point in the folding area corresponding to the hovering gesture.

In accordance with another aspect of the present disclosure, an electronic device is provided. The electronic device includes a flexible display bendable with reference to a folding line, and a processor configured to, in response to an input of a hovering gesture on a folding area comprising the folding line, control the flexible display to display a UI on a hovering point corresponding to the hovering gesture, wherein the hovering point corresponding to the hovering gesture is determined by adjusting at least one hovering position sensed in the folding area.

In accordance with another aspect of the present disclosure, an electronic device is provided. The electronic device includes a flexible display bendable with reference to a folding line, and a processor configured to, in response to a movement of a hovering gesture on a folding area comprising the folding line, adjust a plurality of hovering positions sensed in the folding area to determine a plurality of hovering points, and determine a moving direction of the hovering gesture based on the plurality of hovering points.

In accordance with another aspect of the present disclosure, an electronic device is provided. The electronic device includes a flexible display bendable with reference to a folding line, an input unit, and a processor configured to, in response to a movement of a hovering gesture using the input unit on a folding area comprising the folding line, determine a moving direction of the hovering gesture based on a motion characteristic of the input unit.

According to various embodiments of the present disclosure, an accurate hovering point corresponding to the hovering gesture on the flexible display can be determined.

According to an embodiment of the present disclosure, it is possible to determine a hovering point corresponding to the hovering gesture in the folding area, according to the hovering gesture on the folding area where the flexible display is bent. As a result, the electronic device is capable of accurately reflecting the intention of a user performing the hovering gesture. Since functions such as selecting, implementing, moving, and so on of an object on the flexible display can be performed in response to an accurate hovering point corresponding to the hovering gesture, satisfaction of a user of the electronic device can be enhanced.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 15A to 15E are view to explain a method for determining a hovering point at an electronic device in an out-folding state according to an embodiment of the present disclosure;

FIGS. 22A to 23C are views of a screen of an electronic device selecting an item displayed on a folding area according to an embodiment of the present disclosure;

FIGS. 24A to 25B are views provided to explain a method of an electronic device for recognizing a movement of a hovering point according to an embodiment of the present disclosure;

FIGS. 26A to 27B are views of a screen of an electronic device displaying a UI in response to a movement of a hovering gesture according to an embodiment of the present disclosure.

Throughout the drawings, it should be noted that like reference numbers are used to depict the same or similar elements, features, and structures.

DETAILED DESCRIPTION

Figure 1C:
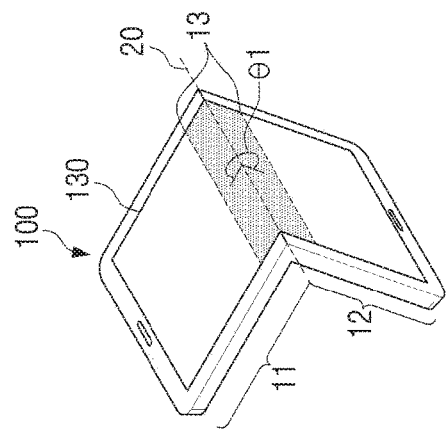
FIGS. 1A to 1E are views provided to explain an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the description, the expression such as "have," "may have," "comprise," or "may comprise," and so on refer to an existence of a corresponding characteristic (e.g., element such as number, function, component, and so on), and does not foreclose the existence of additional characteristic.

The expression "A or B," "at least one of A or/and B," or "at least one or more of A or and/B," and so on, may encompass every possible combination of items listed with the expression. For example, "A or B," "at least one of A and B," or "at least one of A or B" may refer to every instance including (1) comprising at least one A; (2) comprising at least one B; or (3) comprising all of at least one A and at least one B.

The expression "1," "2," "first," or "second" as used herein may modify a variety of elements, irrespective of order and/or importance thereof, and only to distinguish one element from another. Accordingly, without limiting the corresponding elements.

When a certain element (e.g., first element) and another element (e.g., second element) are described as being "operatively or communicatively) coupled with/to" each other, or "connected to" each other, this should be understood as meaning that the certain element and another element are directly coupled or coupled via yet another element (e.g., third element). On the other hand, when a certain element (e.g., first element) and another element (e.g., second element) are stated as being "directly coupled" or "directly connected" with each other, this may be understood as meaning that the certain element and another element are not intervened by yet another element (e.g., third element) present therebetween.

The expression "configured to" as used herein may be exchanged depending on occasions, with, for example, "suitable for," "having the capacity to," "designed to," "adapted to," "made to" or "capable of" and used. The term "configured to" does not necessarily refer to an example of being hardware-wise "specifically designed to." Instead, in any circumstances, the expression "configured to" may refer to a meaning that a device "may be able to" perform with another devices or components. For example, in a phrase "a process configured to perform A, B, and C," the "processor" may refer to a dedicated processor (e.g., embedded process) provided to perform a corresponding operation, or a generic-purpose processor capable of performing corresponding operations by implementing one or more software programs stored on a memory device (e.g., central processing unit (CPU) or application processor).

A "user input" as used herein may include at least one of bending input, voice input, button input, and multimodal input, but not limited thereto. Further, the "user input" may include a touch gesture input as a contact touch, and a hovering gesture as a non-contact touch. The user may select, execute or move an object on a flexible display by a hovering gesture manner. The hovering gesture may be performed with a variety of input tools (e.g., user's finger, stylus pen, digitizer pen)

Throughout the description, an application may be a group of a series of computer programs that are designed to perform a specific service.

The terminology used herein, including technical and scientific terminologies, may have a meaning that is same as that generally understood by those skilled in the art of the technical fields described herein. Among the terms used herein, the terms defined in general dictionaries may be interpreted to be the same or similar meaning based on the context of the related technology, and unless otherwise specified herein, are not interpreted to be ideal or excessively formal meaning. Depending on occasions, even a term defined herein cannot be interpreted as foreclosing the various embodiments of the description.

FIGS. 1A to 1E are views to explain an electronic device according to an embodiment of the present disclosure.

Referring to FIGS. 1A to 1E, the electronic device 100 may employ a flexible display 130 that can be bent and folded. For example, the electronic device 100 may apply various forms of the flexible display 130 that can change a form with an external force, such as, a foldable display that can be folded or spread by a certain angle or curvature, a bendable display that can be bent or spread by a certain curvature, and a rollable display that can be rolled into a cylinder shape. The flexible display 130 may be categorized into a first area 11 and a second area 12 based on a folding line 20. Upon folding, a folding area 13 including the folding line 20 may be determined on the flexible display 130. The folding area 13 may include a portion of each of the first area 11 and the second area 12. The folding area 13 refers to a surrounding area of the folding line.

The folding area 13 may be determined to be different sizes and shapes adjacent to the folding line according to the folding state of the electronic device 100. For example, the size of the folding area 13 may be determined according to the folding angle at which the electronic device 100 is folded inward or outward. In this case, as a folding angle ($\theta$1) of the electronic device 100 folded inward increases, the size of the folding area 13 may increase. As a folding angle of the electronic device 100 folded outward increases, the size of the folding area 13 may increase.

The folding line 20 may refer to a line on which the flexible display 130 is bent or folded. The folding line 20 may be a line corresponding to the boundary that can distinguish the first and second areas. When the flexible display 130 is bent, at least a portion of the flexible display 130 may have a deformation, in which case a line connecting the points of the greatest deformation may be regarded as the folding line.

For example, the folding line 20 may be an axis of bending or folding about a hinging means provided in the electronic device 100. When the electronic device 100 is folded symmetrically, the folding line 20 may be the line at the center of the flexible display 130.

The electronic device 100 may not be provided with the hinging means. In this case, the folding line 20 may be an arbitrary line on which the flexible display 130 is bent or folded by various angles and directions (e.g., vertical, horizontal or diagonal direction, and so on) with the external force from a user.

The "folding state" as used throughout the description may refer to a state in which the electronic device 100 is bent inward or outward with reference to the folding line 20. The "folding state" may include any of "in-folding state" and "out-folding state." As a term distinguished from the "folding state," "un-folding state" may be used herein, which refers to a state that the electronic device 100 is spread as the folding angle (θ1) of the electronic device 100 is 180° or close to 180°, as illustrated in FIG. 1A.

Figure 1B:
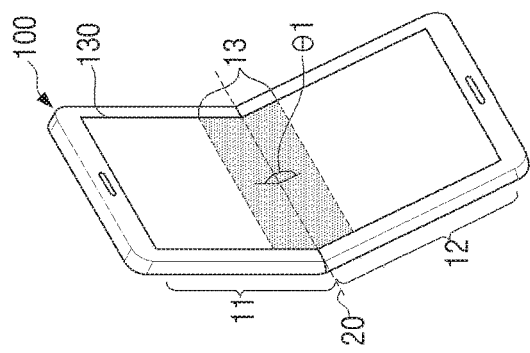
Figure 1E:
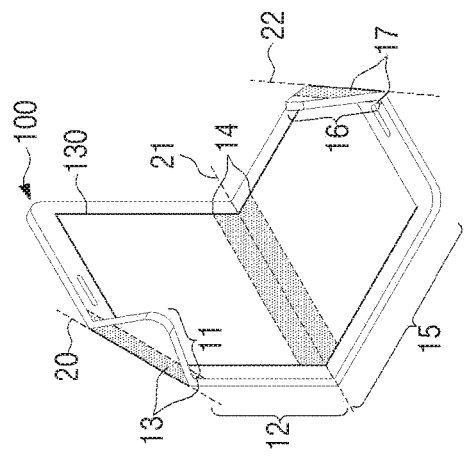
Figure 1A:
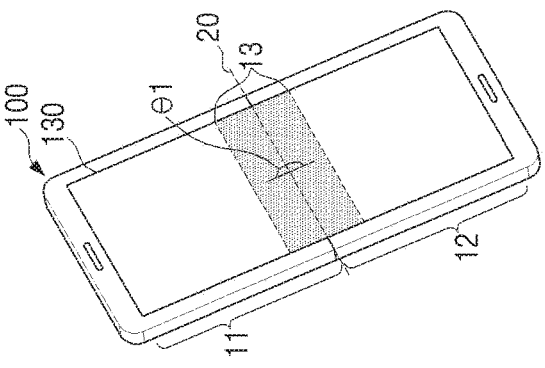

Referring to FIGS. 1A to 1E, the electronic device 100 may be converted, for example, from the un-folding state as in FIG. 1A into the in-folding state as in FIG. 1B.

The "in-folding state" as used throughout the description may refer to a state in which the electronic device 100 is bent inward with reference to the folding line 20. In this case, the folding angle (θ1) of the electronic device 100 may be from 0° to 180°. In this case, the state of the folding angle (θ1) being 0° may indicate a state in which the electronic device 100 is completely folded inward based on the folding line 20 so that the first area 11 and the second area 12 are in parallel or almost parallel with each other with the ventral surfaces thereof facing each other. This state may be referred to as a "complete in-folding state" of the electronic device 100.

Referring to FIGS. 1A to 1E, the electronic device 100 may be converted, for example, from the un-folding state as in FIG. 1A into the out-folding state as in FIG. 1C.

The "out-folding state" as used throughout the description may refer to a state in which the electronic device 100 is bent outward with reference to the folding line 20. In this case, the folding angle (θ1) of the electronic device 100 may be from 180° to 360°. In this case, the state of the folding angle (θ1) being 360° may indicate a state in which the electronic device 100 is completely folded outward based on the folding line 20 so that the first area 11 and the second area 12 are in parallel or almost parallel with each other with the rear surfaces thereof facing each other. This state may be referred to as a "complete out-folding state" of the electronic device 100.

Figure 1D:
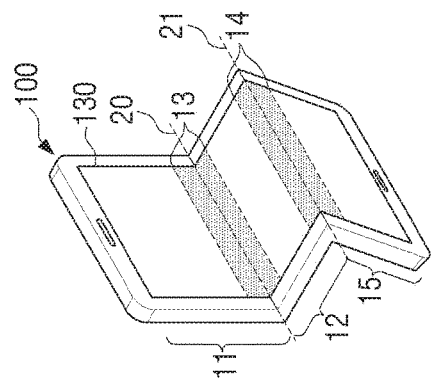

As illustrated in FIG. 1D, the electronic device 100 may include a plurality of folding lines 20 and 21. In this case, the electronic device 100 may include both the in-folding state and the out-folding state. Further, the flexible display 130 may include the first area 11, the second area 12, and a third area 15 based on a plurality of folding lines 20 and 21. The flexible display 130 may include a plurality of folding areas 13 and 14 each containing the plurality of folding lines 20 and 21

FIGS. 1A to 1D illustrate a state in which a bezel area covering the surrounding area of the flexible display 130 is provided with the hinging means. In this case, the number, and positions of the folding lines may be fixed according to the number, and positions of the hinging means. Further, the folding areas may be determined to be flat areas neighboring the folding lines, and the sizes thereof may vary according to the folding degrees.

The bezel of the electronic device 100 may itself be formed from a flexible material, or the electronic device may be implemented in a structure that excludes the bezel. FIG. 1E illustrates the embodiment described above. When the electronic device 100 is not provided with the hinging means, the flexible display 130 may be bent or folded by various angles and directions with the external force from a user. In this case, the flexible display 130 may include a plurality of folding lines 20, 21, and 22 based on the line where the flexible display is bent or folded with the external force from a user. The flexible display 130 may include the first area 11, the second area 12, the third area 16, and a fourth area 17 based on a plurality of folding lines 20, 21, and 22. Further, the flexible display 130 may include a plurality of folding areas 13, 14, 17 each containing a plurality of folding lines 20, 21, 22.

A plurality of folding lines may be formed at various positions as intended by a user. The folding area may be used to generally indicate all the areas of the neighboring area of the folding line where the deformation occurs.

In the various embodiments described below, it is assumed that the electronic device 100 includes one folding line 20, although all the various embodiments are applicable to an example in which the electronic device 100 includes a plurality of folding lines as illustrated in FIG. 1D or 1E.

Figure 2:
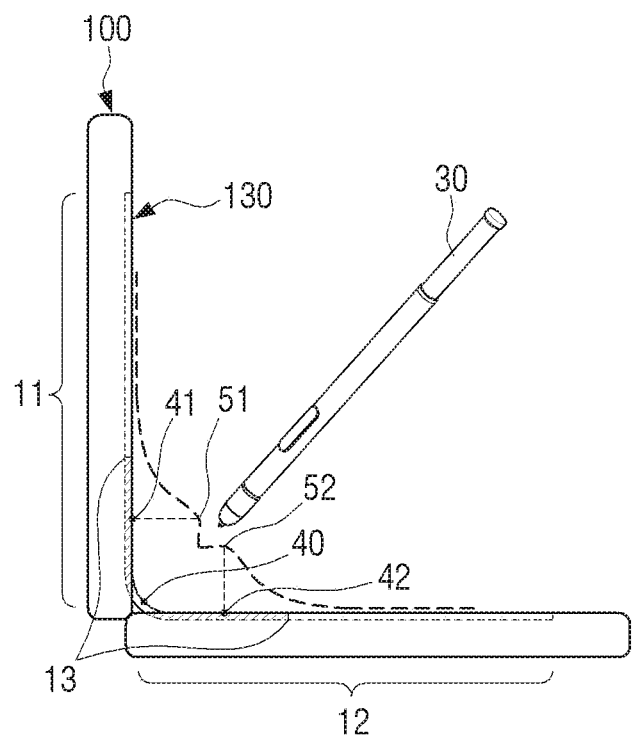
FIG. 2 is a side view of an electronic device, provided to explain a sensing degree according to a hovering gesture according to an embodiment of the present disclosure.

FIG. 2 is a side view of an electronic device, provided to explain a sensing degree according to a hovering gesture according to an embodiment of the present disclosure.

Referring to FIG. 2, the electronic device 100 may be bent inward and become the folding state. In the folding state, the electronic device 100 may sense the hovering gesture made by a user using the inputting means 30 on the folding area 13 of the flexible display 130. In this case, even when a user performs the hovering gesture at the hovering point 40 where a user desires to select, the sensed value of a peak point (e.g., capacitance value or magnetic field value) may not be measured from the hovering point 40. When the hovering gesture is performed in the folding state, the hovering gesture may be sensed from several areas of the flexible display 130 as illustrated in FIG. 2. For convenience of explanation, the point of the first area 11 where the hovering gesture is sensed is referred to as the first position 41, and the point of the second area 12 where the hovering gesture is sensed is referred to as the second position 42. For example, the sensed value of the peak point 51 according to the hovering gesture may be measured at the first position 41 of the first area 11, and the sensed value of the peak point 52 according to the hovering gesture may be measured at the second position 42 of the second area 12.

When a distance from the inputting means 30 to the first position 41 and to the second position 42 is shorter than the distance from the inputting means 30 to the hovering point 40, the hovering gesture may be sensed differently at the first position 41 than at the second position 42 from the user's intention. In this case, the hovering gesture may be sensed at both the first position 41 and the second position 42. Further, the hovering gesture may be sensed across the first position 41 and the second position 42.

The electronic device 100 may determine a hovering point on the flexible display 130 corresponding to the hovering gesture, based on the first position 41 and the second position 42. Specific methods for determining a hovering point are described below with respect to FIGS. 3A to 5.

Figure 3A:
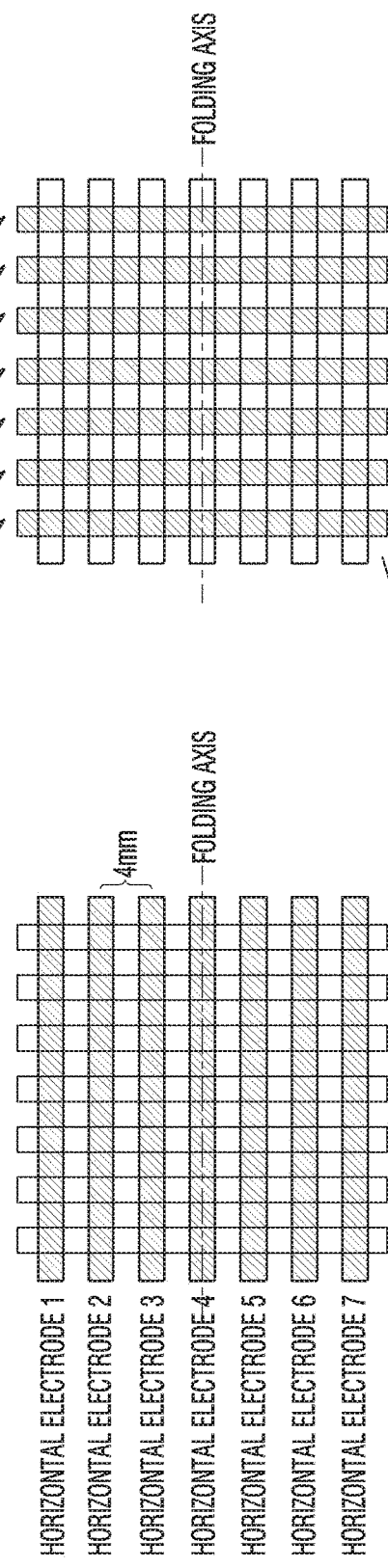
FIGS. 3A to 3C are views illustrating a sensing degree on X and Y axes according to a hovering gesture according to an embodiment of the present disclosure.
Figure 3B:
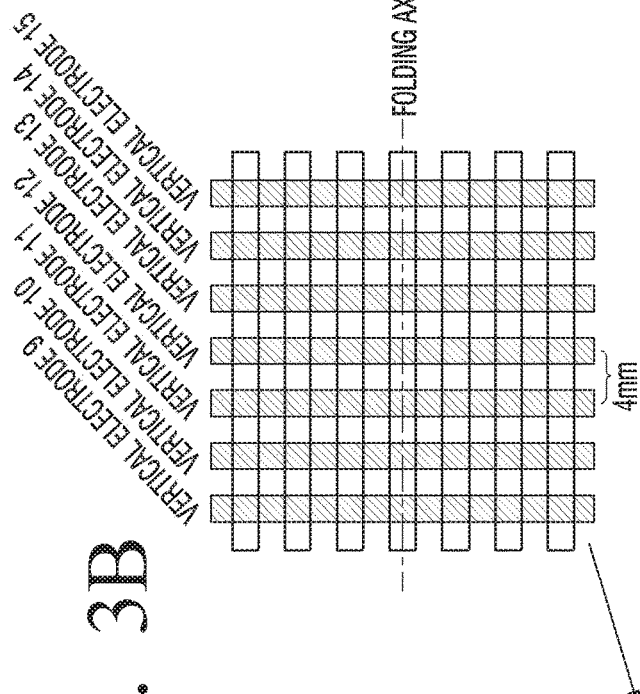
Figure 3C:
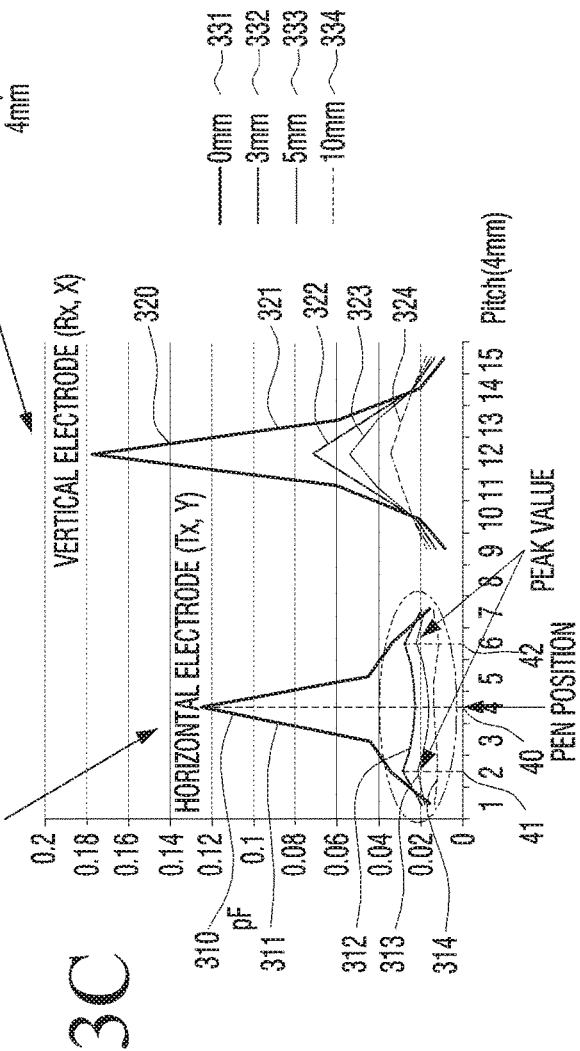

FIGS. 3A to 3C are views illustrating a sensing degree on X and Y axes according to a hovering gesture in folding state according to an embodiment of the present disclosure.

Referring to FIGS. 3A to 3C, the flexible display 130 may be folded by 90° so as to have a 5R rounding (curvature). In this case, the graphs 310 and 320 of FIG. 3C represent the sensed values (e.g., capacitance values) measured on a touch panel according to the hovering gesture of a user.

The touch panel of the flexible display 130 is provided to sense the hovering gesture, and may include a plurality of horizontal electrodes and a plurality of vertical electrodes. The points where a plurality of horizontal electrodes and a plurality of vertical electrodes intersect will be referred to as electrode junctions.

FIG. 3A illustrates the horizontal electrodes of the flexible display 130, and FIG. 3B illustrates the vertical electrodes of the flexible display 130.

Referring to FIG. 3A, the horizontal electrodes constituting the flexible display 130 may measure the capacitance value generated from the horizontal direction of the flexible display 130 according to the hovering gesture. For example, it may be assumed that the pitch between the horizontal electrodes is about 4 mm, and the width of the horizontal electrodes is 1 mm.

Referring to FIG. 3B, the vertical electrodes constituting the flexible display 130 may measure the capacitance value generated from the vertical direction of the flexible display 130 according to the hovering gesture. For example, it may be assumed that the pitch between the vertical electrodes is about 4 mm, and the width of the vertical electrodes is about 2 mm.

FIG. 3C illustrates the coordinates that represent the capacitance values measured through the horizontal and the vertical electrodes. The numbers on X axis may respectively represent the horizontal and the vertical electrodes of FIGS. 3A and 3B. For example, '4' on X axis may represent the horizontal electrode 4. Further, '12' on X axis may represent the vertical electrode 12. The numbers on Y axis respectively represent the capacitance values that can be measured through the horizontal and the vertical electrodes. The unit of the capacitance value may be pF (picofarad).

Referring to FIG. 3C, the graphs may be categorized into four series 331, 332, 333, and 334 according to the distances from the inputting means 30 to the flexible display 130. The series 331 indicates that the inputting means 30 contacts to the flexible display 130. The series 332, 333, and 334 indicate that the distances from the inputting means 30 to the flexible display 130 are 3 mm, 5 mm, and 10 mm, respectively.

Referring to FIG. 3C, the graphs 311, 312, 313, and 314 represent the capacitance values measured through the horizontal electrodes according to the four series described above. The graphs 321, 322, 323, and 324 represent the capacitance values measured through the vertical electrodes according to the four series described above.

The graph 311 may represent the capacitance value which may be measured and represented to be a peak point at the position 40 where the inputting means 30 contacts the flexible display 130. As a result, the electronic device 100 may determine the position 40 to be a hovering point a user desires to select with the hovering gesture.

Referring to the graph 312, the inputting means 30 and the flexible display 130 may be displaced from each other by a certain distance. The capacitance value may be measured and represented as a peak point at positions 41 and 42 other than the position a user desires to select with the hovering gesture. In this case, the electronic device 100 may determine a correct hovering point on the flexible display 130 corresponding to the hovering gesture of a user based on the values measured from the two positions 41 and 42.

Figure 4:
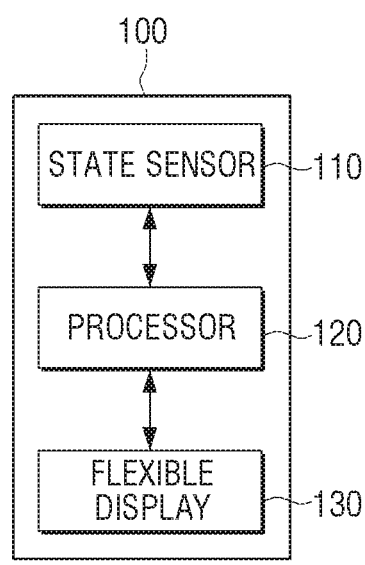
FIG. 4 is a block diagram of an electronic device according to an embodiment of the present disclosure.

FIG. 4 is a block diagram of an electronic device 100 according to an embodiment of the present disclosure.

Referring to FIG. 4, the electronic device 100 may be a smart phone, but is not limited thereto. For example, the electronic device 100 of FIG. 4 may include at least one of a tablet personal computer, a mobile phone, a video phone, an e-book reader, a netbook computer, a workstation, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, or a wearable device.

The wearable device may include at least one of an accessory type (e.g., watch, ring, bracelet, anklet, necklace, glasses or head mounted device (HMD)), a fabric or cloth-integration type (e.g., electronic clothing), a body attached type (e.g., skin pad or tattoo), or a bio-implant type (e.g., implantable circuit).

In another embodiment, the electronic device 100 may be home appliance. The home appliance may include at least one of a television, a digital video disc (DVD) player, an audio, a refrigerator, an air conditioner, a cleaning machine, a laundry machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic frame.

In another embodiment, the electronic device 100 may include at least one of various medical devices (e.g., various portable medical diagnostic devices (e.g., blood sugar diagnostic device, heart beat diagnostic device, blood pressure diagnostic device, or temperature diagnostic device), magnetic resonance angiography (MRA), magnetic resonance imaging (MRI), computed tomography (CT), photographing device, and ultrasound device), a navigation device, global navigation satellite system (GNSS), event data recorder (EDR), flight data recorder (FDR), a car infotainment device, a ship electronic device (e.g., a ship navigation device, a gyro compass, and so on), avionics, a security device, a car head unit, an industrial or domestic robot, automatic teller machine (ATM) of a financial organization, point of sales (POS) at a shop, or an internet of things device (e.g., bulb, various sensors, electric or gas meter, sprinkler device, fire warning device, thermostat, streetlamp, toaster, exercise machine, hot water tank, heater, boiler, etc.).

In another embodiment, the electronic device 100 may include at least one of furniture or a portion of a building/structure, an electronic board, an electronic signature receiving device, a projector, or various measuring devices (e.g., water, electricity, gas, or electromagnetic wave measuring devices).

The electronic device 100 may be a combination of one or more of a variety of devices stated above, and may include a new electronic device as the technology develops. The electronic device 100 may include a folding structure implemented with a hinge and a flexible material on the folding line 20.

Referring to FIG. 4, the electronic device 100 may include at least one of a state sensor 110, a processor 120, and the flexible display 130.

The state sensor 110 may sense the folding state of the electronic device 100. For example, the state sensor 110 may sense whether the electronic device 100 is in un-folding or folding state. The state sensor 110 may sense whether the electronic device 100 is in in-folding or out-folding state. The state sensor 110 may sense a folding angle as the folding state of the electronic device 100.

The state sensor 110 may sense the folding state by using various sensors. For example, the state sensor 110 may include a plurality of bend sensors disposed on the flexible display 130 or at a bezel side of the electronic device 100. The bend sensor refers to a sensor that is bendable and has such a property that the bend sensor varies resistance value according to the bending degree. The bend sensor may be implemented in various forms, such as fiber optic bending sensor, pressure sensor, strain gauge, and the like. The state sensor 110 may sense the change in the resistance value by applying the voltage to the bend sensor, and thus sense whether the electronic device 100 is folded or not. By the larger change in the resistance value, it may be determined that the greater folding occurs. Additionally, when the electronic device 100 includes the hinging means, the state sensor 110 may sense the folding state by using a contact sensor, a light receiving sensor, a hall sensor, or magnetic sensor, and so on, provided in the hinging means.

When the folding state of the electronic device 100 is determined by the state sensor 110, the state sensor 110 may provide the determined result to the processor 120. In this case, the processor 120 may identify the folding state of the electronic device 100 according to the outputting of the state sensor 110 without having to separately determine the folding state of the electronic device 100. Alternatively, when the state sensor 110 provides information regarding the folding state or sensing information of the state sensor to the processor 120, the processor 120 may determine the folding state of the electronic device 100.

The flexible display 130 may include a display panel which displays a screen showing information. Further, the flexible display 130 may include at least one of a touch panel and a pen recognition panel.

The flexible display 130 may be bent or folded asymmetrically or symmetrically.

The flexible display 130 may display the information processed or to be processed by an operating system (OS) driven within the electronic device 100. For example, the flexible display 130 may display a screen of implementing an application processed by the OS, a lock screen, a background screen, an application list screen, and so on.

The flexible display 130 may include a function to detect a duration of the touch as well as a touch position, a touch pressure, a touch speed, and an area of touch according to a touch gesture as the contact touch. Further, the flexible display 130 may include a function to detect a duration of hovering as well as a hovering position and an area of hovering according to the hovering gesture as a contactless touch.

The processor 120 may control the overall operation of the electronic device 100. For example, the processor 120 may perform an operation to implement and control the OS, an operation to process various data, an operation to control each element of the electronic device 100, and so on. The processor 120 may drive a plurality of different OSs. Generally, OS manufacturers may provide various OSs (e.g., smart phone OS, tablet OS, computer OS, and so on) according to the screen size of the target device in which OS is driven. Thus, the processor 120 may provide different OS to the first area and the second area, based on the position of the folding line or the folding state of the electronic device 100.

The processor 120 may determine a hovering point corresponding to the hovering gesture based on the first hovering position and the second hovering position sensed in the flexible display according to the hovering gesture of a user on the flexible display 130.

The processor 120 may determine a hovering point corresponding to the hovering gesture by correcting at least one sensed position on the folding area 13 according to the hovering gesture of a user on the folding area 13 including the folding line 20, and control the flexible display 130 to display user interface (UI) at the hovering point.

When the user hovering gesture is moved on the folding area 13 including the folding line 20, the processor 120 may determine a plurality of hovering points by correcting a plurality of hovering positions sensed on the folding area according to the movement. Further, the processor 120 may determine the moving direction of the hovering gesture based on a plurality of determined hovering points.

When the user hovering gesture using the inputting means is moved on the folding area 13 including the folding line 20, the processor 120 may determine the moving direction of the hovering gesture based on the motion characteristic of the inputting means.

In FIG. 4, the state sensor 110 is illustrated and described as a separate element from the processor 120 and the flexible display 130. However, in actual implementation, the state sensor 110 may be implemented such that the state sensor 110 is a function performed at the processor 120. For example, the processor 120 may directly receive the sensing result from the sensors within the flexible display 130, and sense the folding state.

Figure 5:
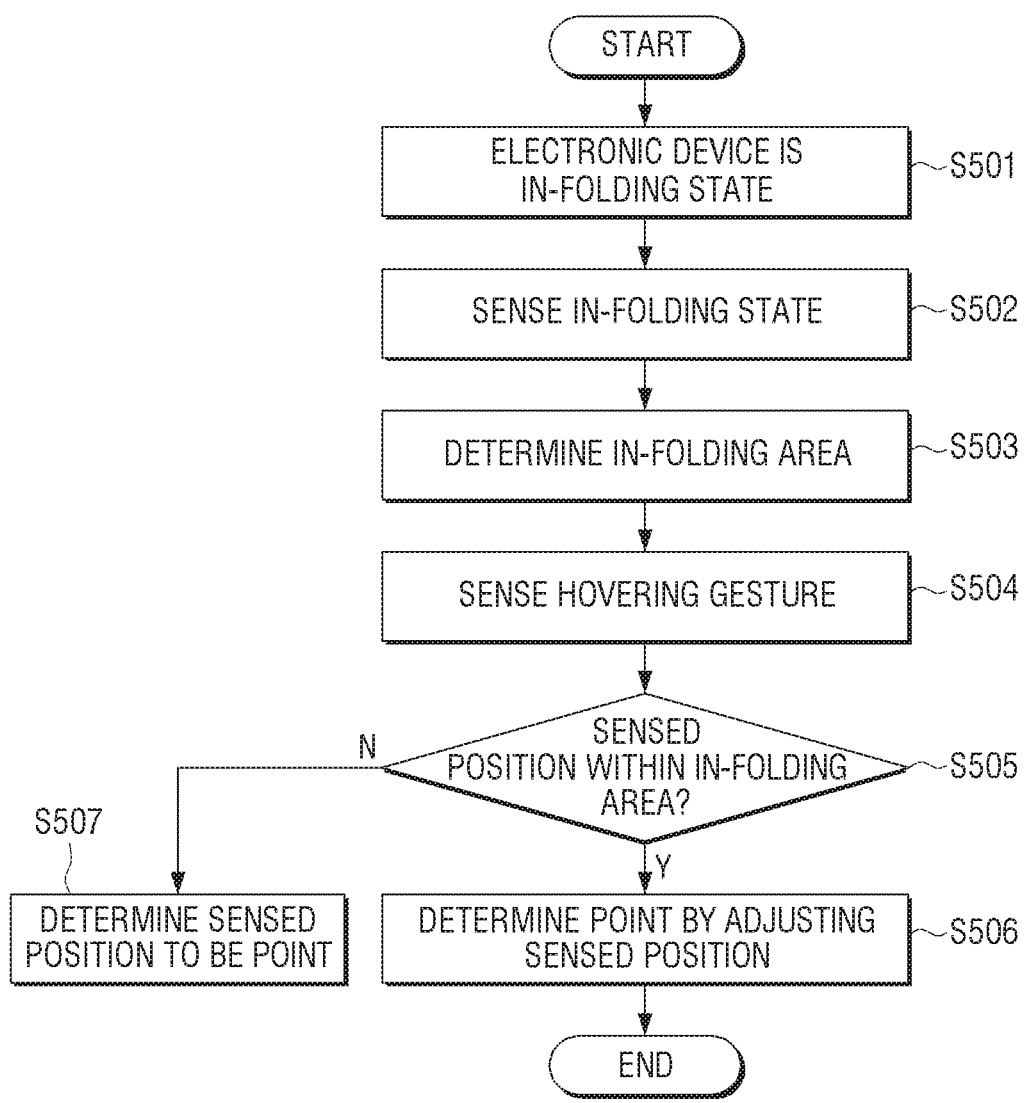
FIG. 5 is a flowchart of a method of an electronic device for processing a gesture according to an embodiment of the present disclosure.

FIG. 5 is a flowchart of a method of an electronic device 100 for processing a gesture according to an embodiment of the present disclosure.

Referring to FIG. 5, the electronic device 100 may be in-folded by the external force from a user, at operation S501.

At operation S502, the electronic device 100 may sense the in-folding state of the electronic device 100 as the electronic device 100 is folded. In this case, when the electronic device 100 is folded based on a plurality of axes, the electronic device 100 may sense a plurality of in-folding states, respectively. When the electronic device 100 is folded in an arbitrary direction by the external force from a user, the electronic device 100 may sense a plurality of in-folding states on a plurality of folding lines according to the arbitrary directions, respectively.

When the in-folding state is sensed, the electronic device 100 may determine the in-folding area where it is necessary to determine a hovering point, by correcting the hovering positions based on the in-folding state, at operation S503. When a plurality of in-folding states are sensed, the electronic device 100 may determine a plurality of in-folding areas based on a plurality of folding lines.

The in-folding area as used herein may indicate a folding area of the electronic device 100 in the in-folding state.

At operation S504, the electronic device 100, being in an in-folding state, may sense the hovering gesture of a user on the flexible display 130.

At operation S505, the electronic device 100 may determine if the hovering gesture is sensed in the in-folding area.

When the hovering gesture is sensed within the in-folding area at operation S505-Y, the electronic device 100 may determine a hovering point by correcting the hovering positions sensed according to the hovering gesture, at operation S506. When the hovering gesture is sensed outside the in-folding area at operation S505-N, the electronic device 100 may determine the hovering position sensed according to the hovering gesture to be hovering point, at operation S507.

FIGS. 6A to 6D are views to explain a method for determining a hovering point at an electronic device in an in-folding state, according to an embodiment of the present disclosure.

Referring to FIGS. 6A to 6D, when the state sensor 110 senses the in-folding state of the electronic device 100, the processor 120 may determine the in-folding area of the electronic device 100. The in-folding area may be determined within a certain distance from both side areas based on the folding line. The size of the in-folding area may be differently determined according to the folding state, i.e., folding angle. When the hovering gestures is sensed on the flexible display 130, the processor 120 may determine whether there are a plurality of hovering positions in which the sensed values (e.g., capacitance values) have peak points according to the hovering gesture. Further, the processor 120 may determine whether a plurality of hovering positions may be within the in-folding area.

As a result of determination, when a plurality of hovering positions are determined to be within the in-folding area, the processor 120 may determine the hovering points by using the values associated with a plurality of hovering positions.

Figure 6A:
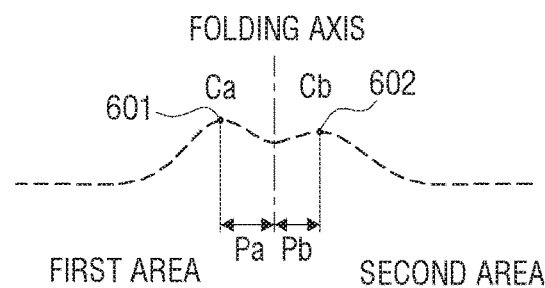
FIGS. 6A to 6D are views to explain a method for determining a hovering point at an electronic device in an in-folding state according to an embodiment of the present disclosure.
Figures 6B, 6C, 6D:
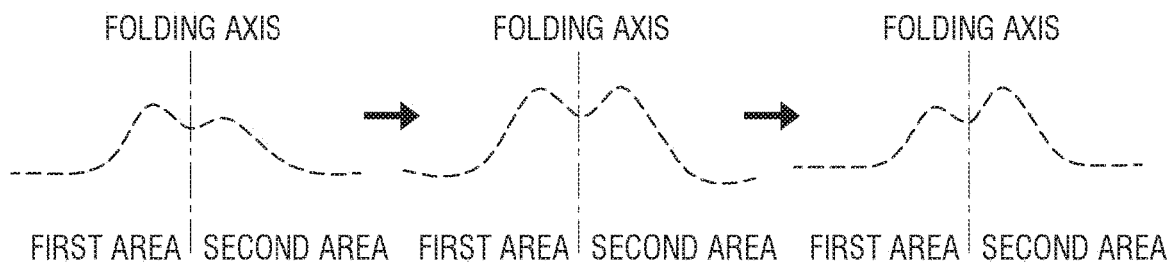

For example, as illustrated in FIG. 6A, the peak point 601 and the peak point 602 may be measured according to the hovering gesture. In this case, the processor 120 may determine a hovering point Ph1 corresponding to the hovering gesture by using sensed values Ca, Cb at the peak points 601 and 602, distance values Pa, Pb from the folding line to the hovering position where the peak point is measured, and variable k according to the folding angle of the electronic device 100. This may be expressed as the following Equation 1.

$$Ph1=f(Ca,Cb,Pa,Pb,k) \quad \text{Equation 1}$$

where f( ) indicates a function implemented to calculate a hovering point with the inputting variables Ca, Cb, Pa, Pb, and k. For example, when a user performs the hovering gesture linearly, the peak point may be changed from FIG. 6B to FIG. 6C, and then to FIG. 6D. In this case, as in the case of FIG. 6C, when the capacitance values of the peak points respectively measured on the first area and the second area are the same or almost the same as each other, the processor 120 may determine the position of the folding line to be the hovering point.

When the hovering gesture is moved continuously, the processor 120 may further perform filtering so that a hovering point is continuously changed. Thus, the processor 120 may further perform filtering so that a hovering point is continuously changed along the hovering positions at which the peak point changes in FIGS. 6B, 6C, and 6D, and so that the gap between the hovering positions is linear.

Referring to FIG. 6A, a method of determining Ph according to the capacitance values Ca and Cb at the peak points 601, 602 may be divided as follows.

1) Ca and Cb are the same or almost the same as each other

In the above case, when Pa and Pb are the same or almost the same as each other, a hovering point may be a position at which "Ph1=0." In this case, the position at which "Ph1=0" may be on the folding line 20.

In the above case, when Pa is greater than Pb, the processor 120 may determine the hovering point to be a specific position of the first area within the folding area where Pa is measured. The hovering point may be a position moved from the folding line to the first area direction at a Pa-Pb:Pa ratio.

In the above case, when Pa is much greater than Pb, the processor 120 may determine whether the hovering gesture is the hovering gesture made with a plurality of stylus pens. When the hovering gesture is determined to be the one made by using the multi-pen, the processor 120 may determine that the first position and the second position are selected, respectively, and perform the corresponding specific functions. In contrast, when the hovering gesture is determined not to be the one made by using the multi-pen, the processor 120 may generate an error event.

2) Cb is greater than Ca

In the above case, when Pa and Pb are the same or almost the same as each other, the processor 120 may determine the hovering point to be a specific position of the first area within the folding area where Pa is measured. The hovering point may be a position moved from the folding line to the first area direction at a Ca-Cb ratio. In this case, Ca and Cb may be calculated as log scale values.

In the above case, when Pa is greater than Pb, the processor 120 may determine the hovering point to be a specific position of the first area within the folding area where Pa is measured. The hovering point may be a position moved from the folding line to a first area direction at a Pa-Pb:Pa ratio or Ca-Cb:Ca ratio. The ratio calculated from Pa and Pb and the ratio calculated from Ca and Cb may be applied to the calculation of the hovering point as almost the same ratios. Ca and Cb may be calculated as log scale values.

In the above case, when Pa is much greater than Pb, the processor 120 may determine whether the hovering gesture is the hovering gesture made with multi-pen. When the hovering gesture is determined to be the one made by using the multi-pen, the processor 120 may determine that the first hovering position and the second hovering position may be selected, respectively, and process various data according to such determination. In contrast, when the hovering gesture is determined not to be the one made by using the multi-pen, the processor 120 may generate an error event.

Figures 7A, 7B:
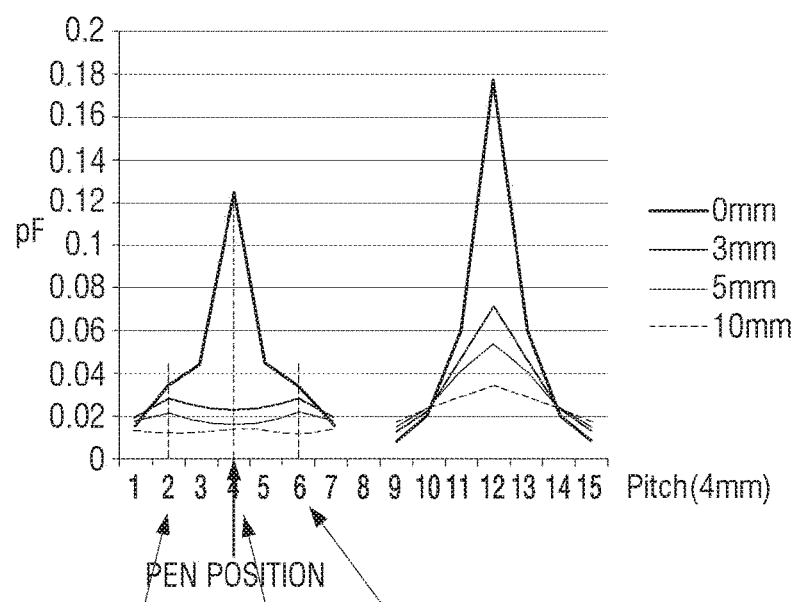
FIGS. 7A and 7B are views to explain a method of an electronic device for determining a hovering point according to an embodiment of the present disclosure.

FIGS. 7A and 7B are views to explain a method of an electronic device for determining a hovering point according to an embodiment of the present disclosure.

Referring to FIGS. 7A and 7B, coordinate values and graphs on the coordinate of FIG. 7A will not be redundantly described below, as these are same as those of FIG. 3C.

When the hovering gesture is sensed on the flexible display 130, the processor 120 may measure the capacitance values through the horizontal electrodes and the vertical electrodes.

FIG. 7B shows a table listing the capacitance values measured by the horizontal electrodes.

The row 701 of the table lists capacitance values measured by the horizontal electrodes when the inputting means 30 contacts the flexible display 130. In this case, the peak point may be 0.125 pF (701-1) which may be measured on the folding line 20. Thus, the hovering point may be positioned on the folding line 20.

The row 702 of the table lists capacitance values measured by the horizontal electrodes when the distance from the inputting means to the flexible display 130 is 3 mm. In this case, the peak points Ca and Cb may be almost same as each other and may be respectively 0.027142 pF (702-1) and 0.02027679 pF (702-2). The distances Pa and Pb to the horizontal electrodes at which Ca and Cb are measured may be respectively displaced from the folding line by 8 mm. The row 702 may correspond to the case in which Ca and Cb are almost same as each other and Pa and Pb are almost same as each other. Therefore, a hovering point may be positioned on the folding line 20.

The row 703 of the table lists capacitance values measured by the horizontal electrodes when the distance from the inputting means to the flexible display 130 is 5 mm. In this case, the peak points Ca and Cb may be almost same as each other and may be respectively 0.021191 pF (703-1) and 0.021841 pF (703-2). The distances Pa and Pb to the horizontal electrodes at which Ca and Cb are measured may be respectively displaced from the folding line by 8 mm. The row 703 may correspond to the case in which Ca and Cb are almost same as each other and Pa and Pb are almost same as each other. Therefore, a hovering point may be positioned on the folding line 20.

The row 704 of the table lists capacitance values measured by the horizontal electrodes when the distance from the inputting means to the flexible display 130 is 10 mm. In this case, the peak points Ca and Cb may be almost same as each other and may be respectively 0.013406 pF (704-1) and 0.014022 pF (704-2). The distances Pa and Pb to the horizontal electrodes at which Ca and Cb are measured may be respectively displaced from the folding line by 12 mm. Thus, the row 704 may correspond to the case in which Ca and Cb are almost same as each other and Pa and Pb are almost same as each other. Therefore, a hovering point may be positioned on the folding line 20.

Figure 8:
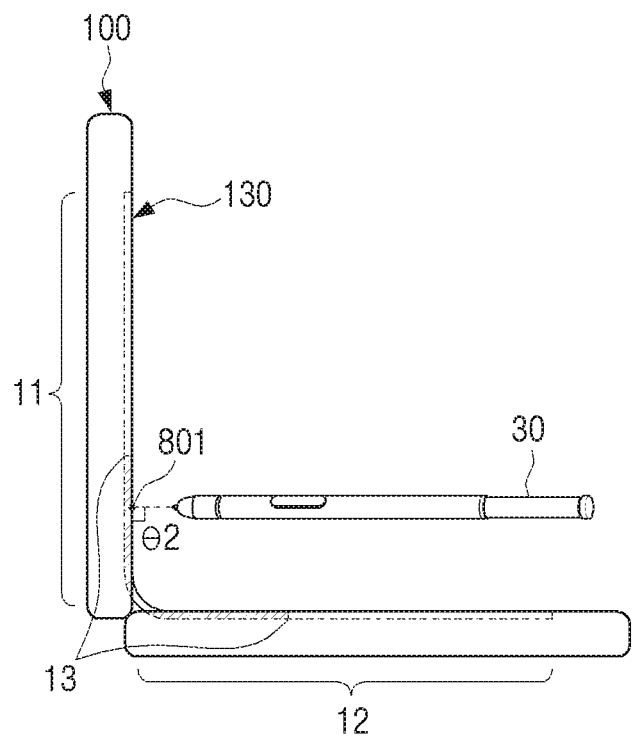
FIG. 8 is a view to explain a method of an electronic device for determining a hovering point according to an embodiment of the present disclosure.

FIG. 8 is a view to explain a method of an electronic device 100 for determining a hovering point according to an embodiment of the present disclosure.

Referring to FIG. 8, when the hovering gesture is sensed on the flexible display, the processor 120 may determine a hovering point by considering the angle between the inputting means 30 performing the hovering gesture and the flexible display 130.

For example, when the angle (θ2) between the inputting means 30 and the first area 11 of the flexible display 130 is vertical or almost vertical (e.g., from 80° to) 100°, the processor 120 may determine a hovering point by giving a weight to the position 801 of the horizontal electrode in the first area at which the peak point Ca is measured. When the peak point Ca measured in the first area and the peak point Cb measured in the second area are same as each other, the processor 120 may also determine that a user performs the hovering gesture to select the first area 11, and thus determine the position 801 of the horizontal electrode in the first area 11 at which the peak point Ca is measured to be the hovering point. This may be expressed as the following Equation 2.

$$Ph2=f(Pa,Ca,k) \quad \text{Equation 2}$$

The processor 120 may use the sensed value sensed at the flexible display 130 according to the hovering gesture in order to determine the angle between the inputting means 30 and the flexible display 130. For example, according to the hovering gesture, the inputting means 30 may be parallel or almost parallel to the second area 12 of the flexible display 130. In this case, there may be more peak points measured in the second area 12 than the peak points measured in the first area 11. Accordingly, the processor 120 may estimate the position and the tilting angle of the inputting means by using the ratio between the peak points measured in the first area 11 and the peak points measured in the second area 12, and the sensing degree at the peak points.

The method for determining a hovering point corresponding to the hovering gesture may be divided as follows.

1) The Ph2 hovering points according to the Equation 2 are respectively different from the Ph1 hovering points according to the Equation 1, and the points are positioned on one of the first area 11 and the second area 12.

In this case, the processor 120 may determine the middle position of the hovering points derived from Ph1 and the hovering points derived from Ph2 to be the final hovering point.

2) The Ph2 hovering points according to the Equation 2 are respectively different from the Ph1 hovering points according to the Equation 1, and either the Ph2 hovering points or the Ph1 hovering points are positioned in the first area 11, and the other are positioned in the second area 12.

In this case, when the angle between the inputting means 30 for the hovering gesture and the second area 12 is from −10° to +10°, the processor 120 may determine the hovering point derived from Ph1 to be the final hovering point. In contrast, when the angle between the inputting means 30 for the hovering gesture and the second area 12 is outside the −10°-+10° range, the processor 120 may determine the hovering point derived from Ph2 to be the final hovering point.

3) Either the Ph2 hovering points by the Equation 2 or the Ph1 hovering points by the Equation 1 are positioned on the folding line, and the other are positioned in the first area 11.

In this case, when the angle between the inputting means 30 for the hovering gesture and the second area 12 is from −10° to +10°, the processor 120 may determine the hovering point derived from Ph1 (Equation 1) to be the final hovering point. In contrast, when the angle between the inputting means 30 for the hovering gesture and the second area 12 is outside the −10°-+10° range, the processor 120 may determine the hovering point derived from Ph2 (Equation 2) to be the final hovering point.

Figure 9A:
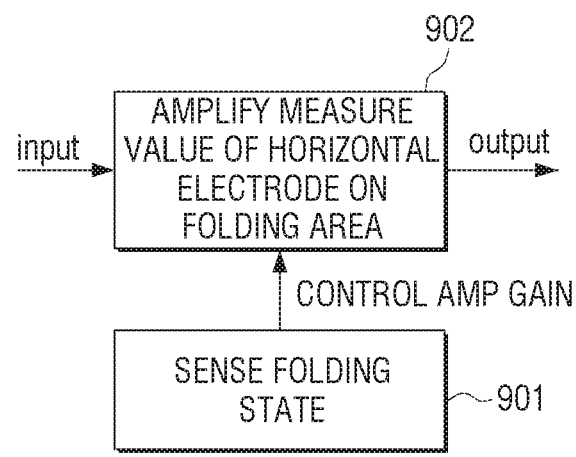
FIGS. 9A and 9B are views to explain a method of an electronic device for determining a hovering point according to an embodiment of the present disclosure.
Figure 9B:
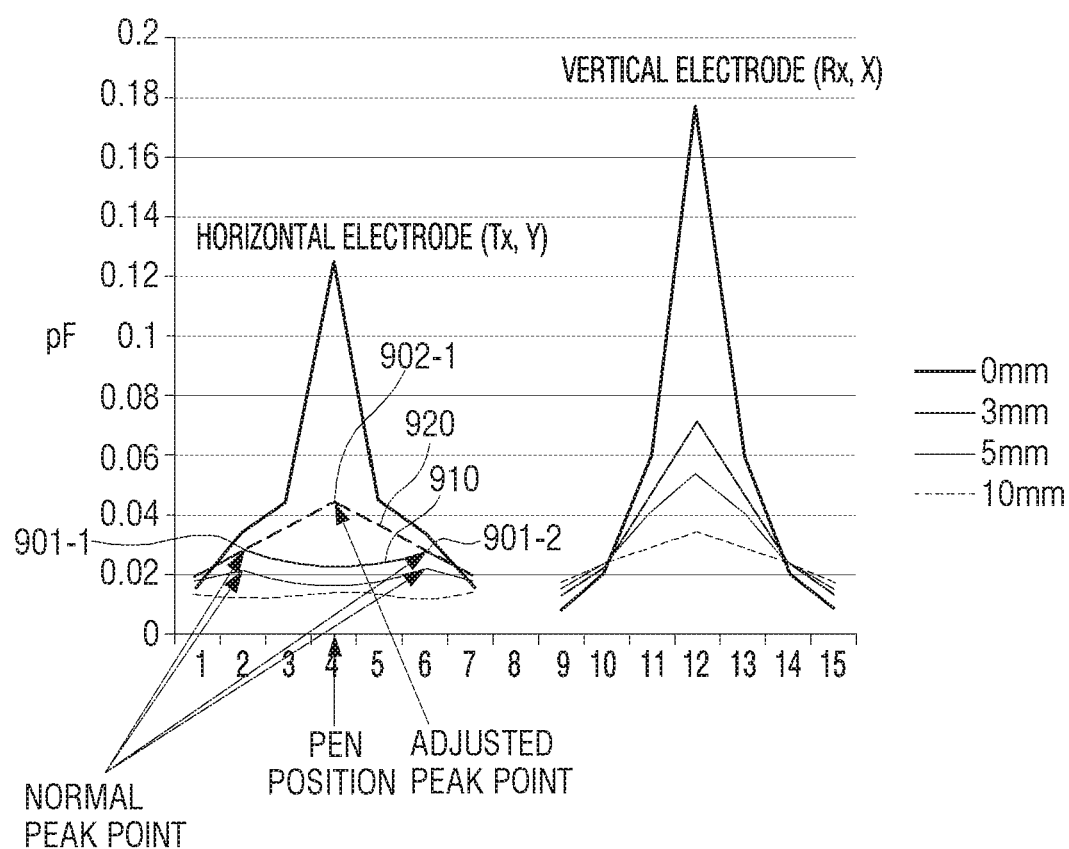

FIGS. 9A and 9B are views provided to explain a method of an electronic device for determining a hovering point according to an embodiment of the present disclosure.

Referring to FIG. 9A, when the folding state is sensed at operation 901, the processor 120 may determine the folding area 13 based on the folding state, and amplify the capacitance value measured from at least one horizontal electrode positioned in the folding area 13, at operation 902. For example, the processor 120 may adjust the amp gain value of the value measured by at least one horizontal electrode influenced by the hovering gesture inn the folding area 13, and thus prevent the capacitance inverse phenomenon from occurring in at least one horizontal electrode. In this case, at least one horizontal electrode as a target of the amp gain value adjustment, and the size of the amp gain value may vary according to the folding angle of the electronic device 100.

Referring to FIG. 9B, the graph 910 represents a graph of the values measured by the horizontal electrodes according to the hovering gesture on the folding area 13 before the amp gain value is adjusted. Further, the graph 920 represents a graph of the values measured by the horizontal electrodes according to the hovering gesture on the folding area 13 after the amp gain value is adjusted.

Regarding the graph 910, the hovering positions at which the capacitance values of the peak points 901-1 and 901-2 are measured may be different from the positions the user desires to select with the hovering gesture. In contrast, regarding the graph 920, the hovering positions at which the capacitance value of the peak point 902-1 is measured may be same as the position the user desires to select with the hovering gesture.

Figures 10A, 10B:
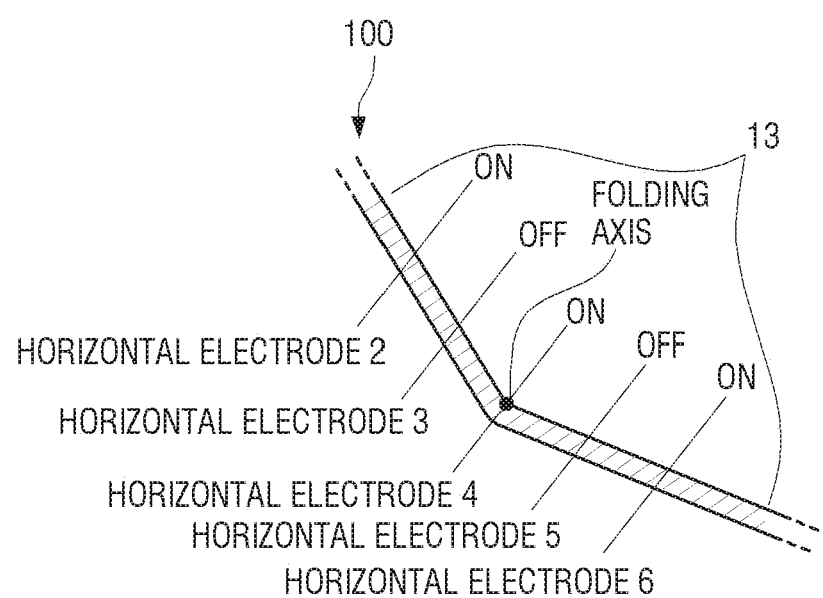
FIGS. 10A and 10B are views to explain a method of an electronic device for determining a hovering point according to an embodiment of the present disclosure.

FIGS. 10A and 10B are views to explain a method of an electronic device for determining a hovering point according to an embodiment of the present disclosure.

Referring to FIGS. 10A and 10B, the horizontal electrodes may measure the capacitance values generated according to the hovering gesture. The closer the horizontal electrodes are to the folding line 20, the more the electrodes are influenced by the hovering gesture on the folding area 13. Thus, when the electronic device 100 becomes the folding state, some of the horizontal electrodes adjacent to the folding line 20 may be switched to the off state, thus preventing generating of the peak points of the capacitance values from the horizontal electrodes irrelevant with the hovering point.

For example, as illustrated in FIG. 10A, the processor 120 may maintain the off state of some horizontal electrodes in every alternate line to minimize the influence of the horizontal electrode according to the hovering gesture. As a result, the horizontal electrode 2, the horizontal electrode 4, and the horizontal electrode 6 may be kept in on state, while the horizontal electrode 1, the horizontal electrode 3, the horizontal electrode 5, and the horizontal electrode 7 may be kept in the off state.

FIG. 10B illustrates the horizontal electrodes in FIG. 10A selectively turned to off state, as viewed from the side of the flexible display 130. The horizontal electrode 2, the horizontal electrode 4, and the horizontal electrode 6 may be kept in the on state, while the horizontal electrode 3 and the horizontal electrode 5 may be kept in the off state.

Figure 11:
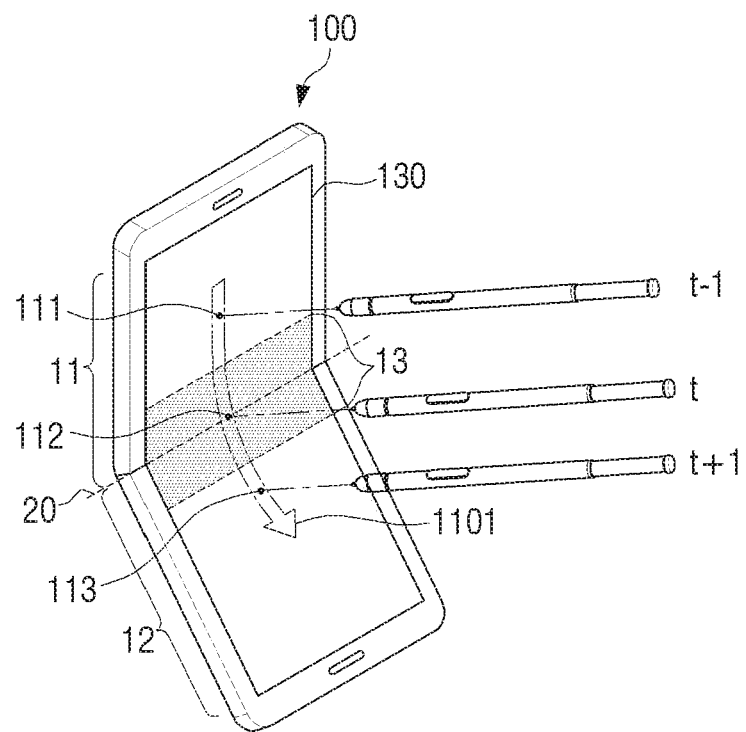
FIG. 11 is a view to explain a method of an electronic device for determining a hovering point according to an embodiment of the present disclosure.

FIG. 11 is a view to explain a method of an electronic device 100 for determining a hovering point according to an embodiment of the present disclosure.

Referring to FIG. 11, when a user performs the hovering gesture, the moving direction of the hovering gesture may be consistent empirically. Further, the hovering gesture random quickly hops to another position, and the moving speed of the hovering gesture may be empirically consistent or positioned within a certain range. Accordingly, the processor 120 may determine a hovering point according to new hovering gesture by using the characteristics of the hovering gesture described above and the history in which the hovering gesture is performed.

The electronic device 100 may use the position determined to be hovering point 112 at time point t, and the position determined to be hovering point 111 at time point t−1 in order to determine a hovering point 113 at time point t+1. For example, when it is assumed that the hovering gesture performing direction 1101 or the hovering gesture moving speed of a user is consistent, the electronic device 100 may determine a hovering point 113 at time point t+1 by considering the moving speed of the hovering gesture along a line of the moving direction 1101 of the previously-determined hovering points 111, 112.

FIGS. 12A to 12D are views to explain a method of an electronic device for determining a hovering point according to a folding angle, according to an embodiment of the present disclosure.

Referring to FIGS. 12A to 12D, the electronic device 100 may determine a hovering point by considering the folding angle (θ3) of the electronic device 100.

Figure 12A:
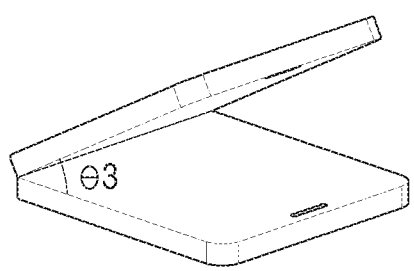
FIGS. 12A to 12D are views to explain a method of an electronic device for determining a hovering point according to a folding angle according to an embodiment of the present disclosure.

For example, as illustrated in FIG. 12A, when the folding angle (θ3) of the electronic device is less than 45°, the electronic device 100 may skip the calculation of a hovering point. The electronic device 100 may control so that the selecting according to the hovering gesture is not performed.

Figure 12B:
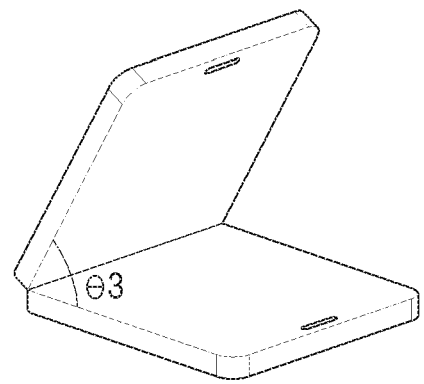

As illustrated in FIG. 12B, when the folding angle (θ3) of the electronic device 100 is equal to, or greater than 45° and less than 90°, the electronic device 100 may determine an accurate hovering point by using the positions determined to be hovering points in the previous time point. For example, the electronic device 100 may determine the position corresponding to an average point of the position determined to be hovering point at the current time point and the positions determined to be hovering points at the previous time point.

Figure 12C:
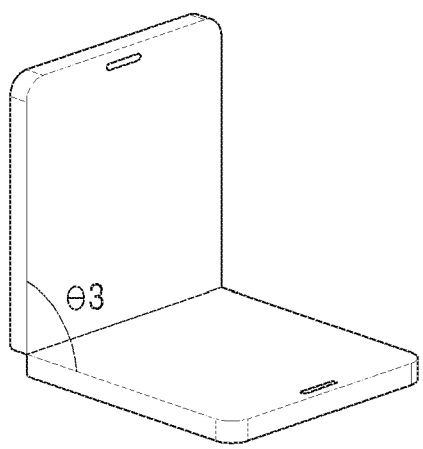

As illustrated in FIG. 12C, when the folding angle (θ3) of the electronic device 100 is 90°, the electronic device 100 may determine the hovering point calculated according to the Equation 1 described with reference to FIGS. 6A to 6D to be the final hovering point.

Figure 12D:
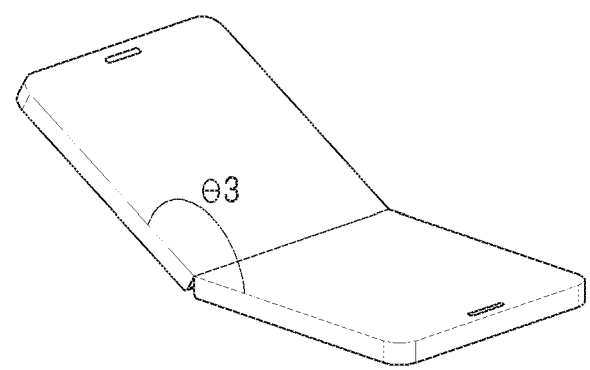

In the same manner, as illustrated in FIG. 12D, when the folding angle (θ3) of the electronic device exceeds 90°, but is not greater than 180°, the electronic device 100 may determine the final hovering point by selecting one from the hovering points calculated according to the Equation 1 and the hovering points calculated according to the Equation 2.

Additionally, the electronic device 100 according to an embodiment may determine a hovering point based on a curvature of the folding line of the electronic device 100. For example, the electronic device 100 may calculate a hovering point by distinguishing a circumstance in which the Pa and Pb are positioned on the curvature due to considerably high curvature of the curved electronic device 100 from a circumstance in which the Pa and Pb are positioned outside the curvature due to considerably low curvature.

Further, the electronic device 100 may previously store in a memory a table for correcting the hovering positions according to the hovering gesture. In this case, the table may store the folding angle, the height of the hovering gesture, the position of the hovering gesture, various types of the sensed waveforms according to the tilting angle of the inputting means of the hovering gesture, and store correcting values regarding the hovering positions according to each sensed waveform. In this case, the electronic device 100 may determine an accurate hovering point according to the hovering gesture by using the table.

Figure 13A:
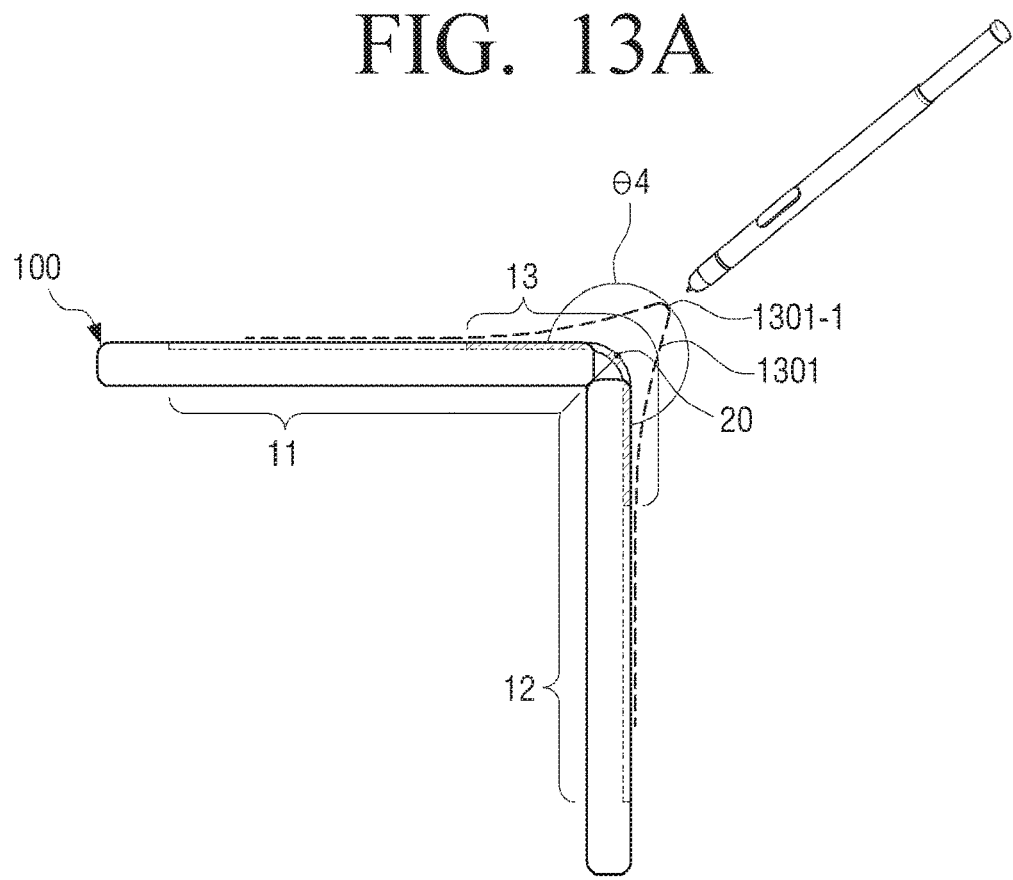
FIGS. 13A and 13B are side views of an electronic device, to explain an out-folding state according to an embodiment of the present disclosure.
Figure 13B:
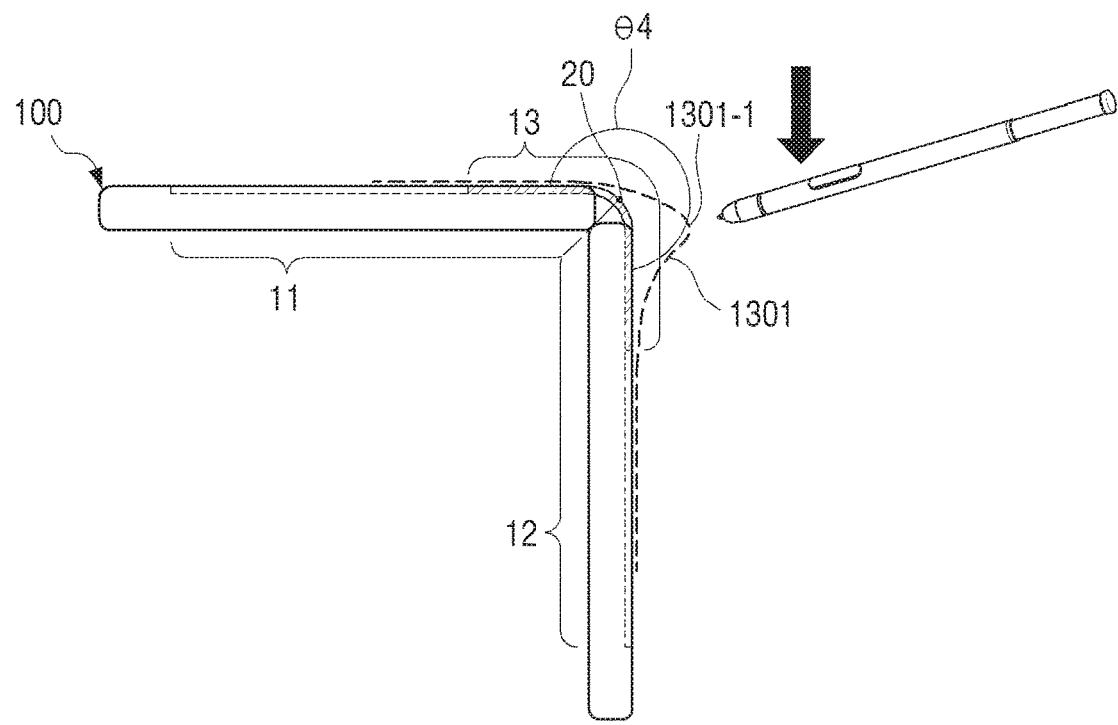

FIGS. 13A and 13B are side views of an electronic device 100, provided to explain an out-folding state according to an embodiment of the present disclosure.

Referring to FIG. 13A, the electronic device 100 may be bent outward and become the out-folding state. In the out-folding state, the electronic device 100 may sense the hovering gesture made by a user on the folding area 13 of the flexible display 130. Referring to FIG. 13A, a graph 1301 is a representation of the sensed values (e.g., capacitance values or electromagnetic values) measured on the touch panel of the flexible display 130 according to the hovering gesture on the folding area 13. In this case, when the sensed value of the peak point 1301-1 is measured by the horizontal electrode positioned on the folding line 20, the hovering position where the horizontal electrode is positioned may be determined to be hovering point.

As illustrated in FIG. 13B, the electronic device 100 may sense the movement of the hovering gesture on the flexible display 130. In this case, the electronic device 100 may determine that a hovering point corresponding to the hovering gesture is positioned nearer to the folding line 20 rather than at a position to which the hovering gesture is substantially moved.

Usually, as the folding angle (θ4) increases, the distance between the inputting means for the hovering gesture and the horizontal electrodes adjacent to the folding line 20 may increase, and accordingly, the sensed values measured by the horizontal electrodes adjacent to the folding line may decrease. As a result, when the hovering gesture is moved on the folding area 13, the hovering point may not instantly follow to the position intended to be selected by the hovering gesture.

Thus, when the hovering gesture is moved on the folding area 13, the electronic device 100 determines a hovering point corresponding to the hovering gesture by correcting the hovering position where the sensed value of the peak point 1301-2 is measured for the accurate determination of a hovering point.

Figure 14:
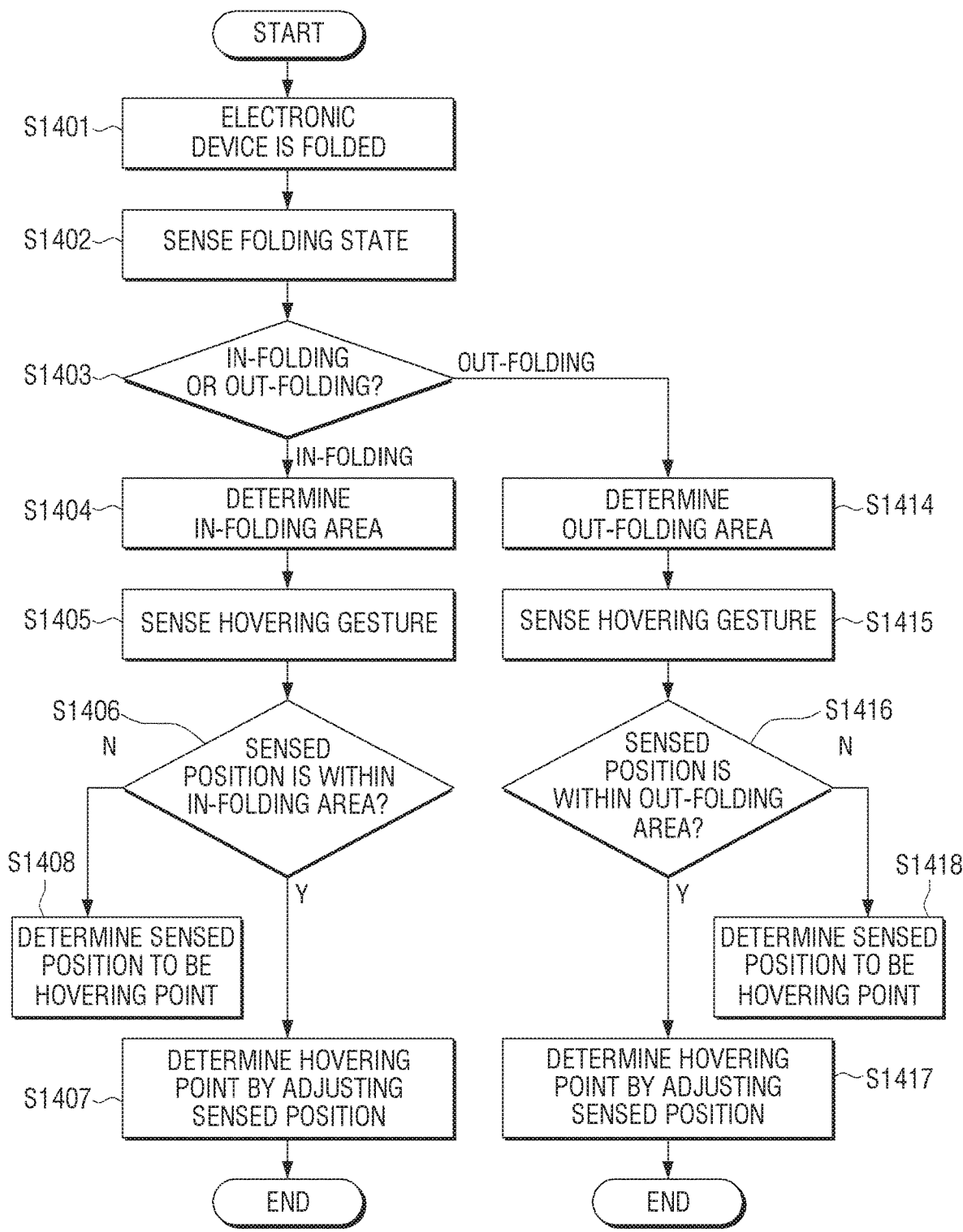
FIG. 14 is a flowchart of a method of an electronic device for processing a gesture according to another embodiment of the present disclosure.

FIG. 14 is a flowchart provided to explain a method of an electronic device for processing a user gesture according to an embodiment of the present disclosure.

Referring to FIG. 14, the electronic device 100 may be folded by a user or an external force, at operation S1401.

At operation S1402, the electronic device 100 may sense the folding state of the electronic device 100. In this case, when the electronic device 100 is folded based on a plurality of axes, the electronic device 100 may sense a plurality of folding states, respectively. When the electronic device 100 is folded in an arbitrary direction by the user, the electronic device 100 may sense a plurality of in-folding states on a plurality of folding lines according to the arbitrary directions, respectively.

At operation S1403, the electronic device 100 may determine whether the electronic device 100 is in the in-folding state or the out-folding state. When a plurality of folding states are sensed, the electronic device 100 may determine whether a plurality of folding states are in-folding states or out-folding states, respectively.

When the electronic device 100 is in the in-folding state at S1403, the electronic device 100 may determine the in-folding area where it is necessary to determine a hovering point, by correcting the hovering position based on the in-folding state, at operation S1404.

At operation S1405, the electronic device 100, being in an in-folding state, may sense the hovering gesture of a user on the flexible display 130.

At operation S1406, the electronic device 100 may determine if the hovering gesture is sensed in the in-folding area.

When the hovering gesture is sensed within the in-folding area at operation S1406, the electronic device 100 may determine a hovering point by correcting the hovering positions sensed according to the hovering gesture, at operation S1407. When the hovering gesture is sensed outside the in-folding area at operation S1406, the electronic device 100 may determine the hovering position sensed according to the hovering gesture to be hovering point, at operation S1408.

When the result of the determination at operation S1403 indicates the electronic device 100 to be in the out-folding state at operation S1403, the electronic device 100 may determine the out-folding area where it is necessary to determine a hovering point, by correcting the hovering position based on the out-folding state, at operation S1414.

The out-folding area may be a folding area of the electronic device 100 in the out-folding state.

At operation S1415, the electronic device 100, being in an out-folding state, may sense the hovering gesture of a user on the flexible display 130.

At operation S1416, the electronic device 100 may determine if the hovering gesture is sensed in the out-folding area.

When the hovering gesture is sensed within the out-folding area at operation S1416-Y, the electronic device 100 may determine a hovering point by correcting the hovering positions sensed according to the hovering gesture, at operation S1417. When the hovering gesture is sensed outside the out-folding area at operation S1416-N, the electronic device 100 may determine the hovering position sensed according to the hovering gesture to be hovering point, at operation S1418.

FIGS. 15A to 15E are views to explain a method for determining a hovering point at an electronic device in an out-folding state, according to an embodiment of the present disclosure.

Referring to FIGS. 15A to 15E, when the state sensor 110 senses the out-folding state of the electronic device 100, the processor 120 may determine the out-folding area of the electronic device 100.

When the hovering gestures is sensed on the flexible display 130, the processor 120 may determine sensed values (e.g., capacitance values) measured according to the hovering gesture in motion, and determine the hovering point by using the hovering position having a peak point.

For example, as illustrated in FIG. 15A, the peak point may be measured according to a movement of the hovering gesture. In this case, the processor 120 may determine a hovering point Ph3 corresponding to the hovering gesture, by using sensed value Ca of the peak point 1501, a distance value Pa from the folding line to the hovering position where the peak point is measured, a distance value P1 from the folding line to the front point of the sensed waveform, a distance value P2 from the folding line to the back point of the sensed waveform, and a variable k according to the folding angle of the electronic device 100. This may be expressed as the following Equation 3.

$$Ph3=f(Ca,Pa,P1,P2,k) \qquad \text{Equation 3}$$

According to the Equation 3, the processor 120 may modify the sensed waveform measured according to the hovering gesture to be gradual, as illustrated in FIG. 15B. The processor 120 may modify the sensed waveform by amplifying the sensing values measured by the horizontal electrodes adjacent to the folding line. The processor 120 may determine a hovering point Ph3 corresponding to the hovering gesture based on the peak point 1502 of the modified sensing waveform.

Accordingly, in response to the movement of the hovering gesture of a user, a hovering point corresponding to the hovering gesture may be moved gradually.

When a user performs the hovering gesture linearly, with the electronic device 100 being in the out-folding state, the peak point may be changed from FIG. 15C to FIG. 15D, and then to FIG. 15E. In this case, the processor 120 may further perform filtering so that a hovering point is continuously changed. For example, the processor 120 may modify the sensed waveform measured at FIG. 15C and FIG. 15E to a gradual form. The processor 120 may further perform filtering by using the peak point measured at FIG. 15D and the peak points acquired from the gradually-changed, sensed waveforms at FIG. 15C and FIG. 15D, so that the hovering point is continuously changed and the gap between the hovering positions become linear.

Figure 16:
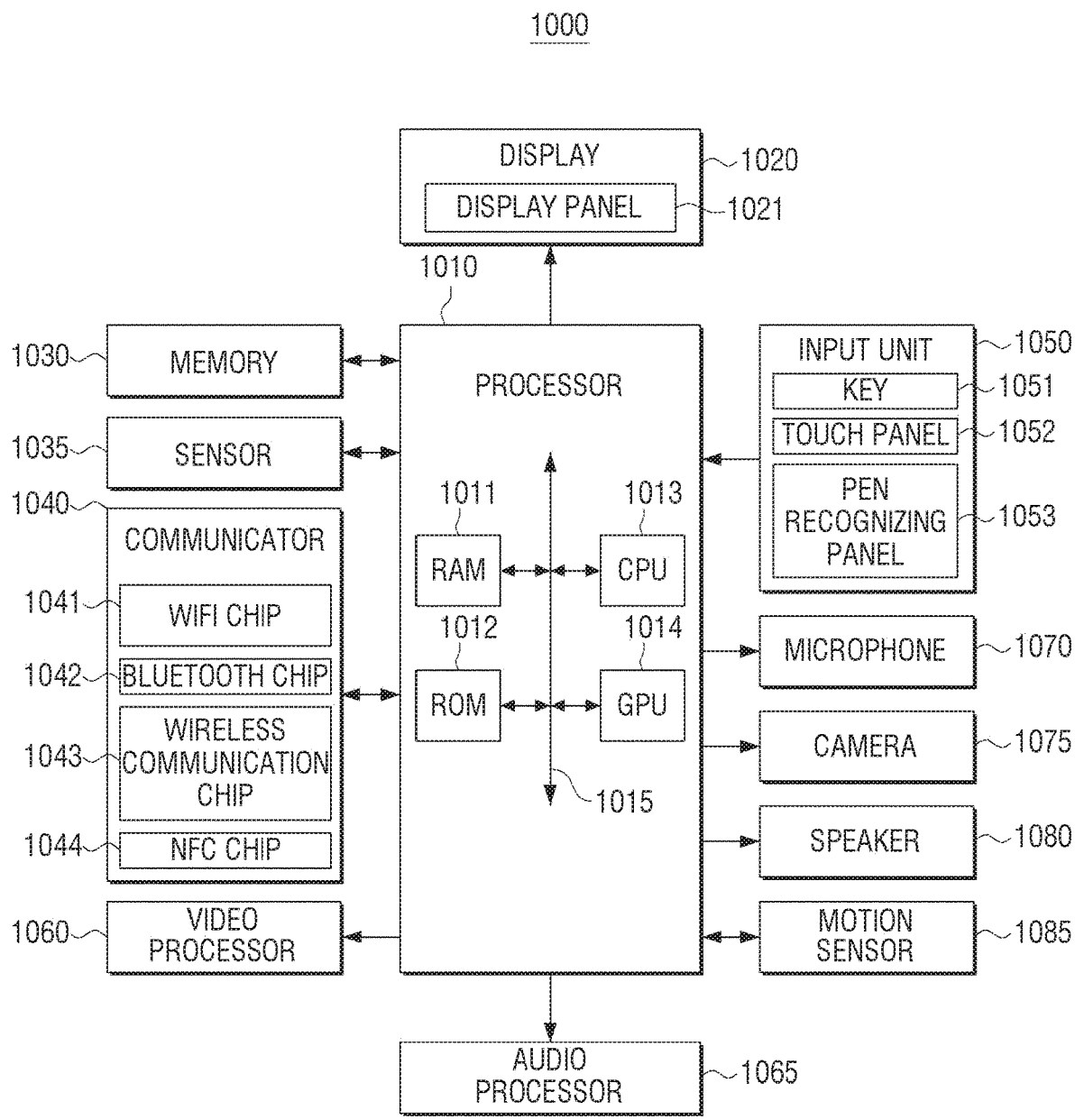
FIG. 16 is a block diagram of an electronic device according to an embodiment of the present disclosure.

FIG. 16 is a block diagram of an electronic device according to an embodiment of the present disclosure.

Referring to FIG. 16, the electronic device 1000 may include at least one of a processor 1010, a display 1020, a memory 1030, a sensor 1035, a communicator 1040, a video processor 1060, an audio processor 1065, an input unit 1050, a microphone 1070, a photographer 1075, a speaker 1080, and a motion sensor 1085.

The input unit 1050 may sense a first hovering position and a second hovering position according to the hovering gesture of a user on the flexible display 130. The processor 1010 may determine a hovering point corresponding to the hovering gesture based on the first and second positions sensed on the flexible display 130. The processor 1010 may correct the hovering position sensed according to the hovering gesture of a user on the folding area of the flexible display 130, and determine a hovering point corresponding to the hovering gesture on the folding area.

The processor 1010 may include at least one of random access memory (RAM) 1011, read-only memory (ROM) 1012, CPU 1013, graphics processing unit (GPU) 1014 and a bus 1015. The RAM 1011, ROM 1012, CPU 1013 and GPU 1014 may be connected to one another through the bus 1015.

The CPU 1013 may access the memory 1030 and perform booting by using OS stored in the memory 1030. The CPU 1013 may perform various operations by using the various programs, contents, data, and the like stored in the memory 1030.

The ROM 1012 may store a command set for system booting, and so on. For example, when a turn-on command is inputted and the electrical power is supplied to the electronic device 100, the CPU 1013 may copy the stored OS in the memory 1030 to RAM 1011 according to the commands stored in ROM 1012, and boot the system by executing the OS. When the booting is completed, the CPU 1013 may copy the various programs stored in the memory 1030 to the RAM 1011, and perform various operations by implementing the programs copied to the RAM 1011. The GPU 1014 may display a UI screen on the display 1020 when the booting of the electronic device 100 is competed. The screen generated at the GPU 1014 may be provided to the display 1020 and displayed on the respective areas of the display 1020.

The display 1020 may include a controller (not illustrated) to control the display panel 1021. The display panel 1021 may be implemented in various forms of display such as a liquid crystal display (LCD), organic light emitting diode (OLED) display, active matrix-OLED (AM-OLED), plasma display panel (PDP), and so on. The display panel 1021 may be implemented flexible, transparent, or wearable.

The display 1020 may be combined with at least one of a touch panel 1052 and a pen recognition panel 1053, and thus provided as the flexible display 130 that can sense the contact touch or the contactless touch.

For example, the flexible display 130 may include an integrated module of the display panel 1021 coupled with at least one of the touch panel 1052 and the pen recognition panel 1053 in a stack structure.

The flexible display 130 may sense the hovering gesture which is a contact touch and a contactless touch. The flexible display 130 may sense the contact touch and the contactless touch made by the input unit 1050 as well as user's fingers.

The memory 1030 may include at least one of an internal memory (not illustrated) and an external memory (not illustrated).

The internal memory may include at least one of a volatile memory (e.g., dynamic RAM (DRAM)), static RAM (SRAM), synchronous dynamic RAM (SDRAM), and so on), a non-volatile memory (e.g., one time programmable ROM (OTPROM), programmable ROM (PROM), erasable and programmable ROM (EPROM), electrically erasable and programmable ROM (EEPROM), mask ROM, flash ROM, and so on), a hard disk drive (HDD) or a solid state drive (SSD).

The processor 1010 may load and process the command or the data received from at least one of the non-volatile memory or the other element. The processor 1010 may store the data received, or generated from the other element in the non-volatile memory.

The external memory may include at least one of compact clash (CF), secure digital (SD), micro-SD, mini-SD, extreme digital (xD) and memory stick.

The memory 1030 may store various programs and data used for the operation of the electronic device 1000. For example, the memory 1030 may store at least a portion of the contents to be displayed on the lock screen temporarily or semi-permanently. The memory 1030 may store the information or the table necessary for determining a hovering point corresponding to the hovering gesture of a user.

The sensor 1035 may sense the folding state of the electronic device 100. For example, the sensor 1035 may sense the folding state or un-folding state by using the hall sensor or the magnetic sensor provided at the folding structure.

The sensor 1035 may measure the bending angle or the folding angle (or spreading angle) of the electronic device 100. The sensor 1035 may detect the position of the folding line which serves as a reference for the bending or folding of the electronic device 100. The sensor 1035 may include state sensors at such points that the state sensors are brought into proximity to each other by the bending or the folding of the electronic device 100, and thus can sense the folding state. The state sensor may include at least one of a near field sensor, an illumination sensor, a magnetic sensor, a hall sensor, a touch sensor, a bending sensor and an infrared sensor, or a combination of the above.

According to another embodiment of the present disclosure, some of the functions of the sensor 1035 may be performed at the processor 1010. For example, the sensor 1035 may provide various measured sensed values to the processor 1010, and the processor 1010 may detect the position of the folding line, or sense the folding state of the electronic device 100 by using the provided sensed values.

The sensor 1035 may sense the folding state of a housing of the electronic device 100 by using the hall sensor or the magnetic sensor provided at the folding structure of the electronic device 100. When the electronic device 100 is provided with the hinge structure, the folding angle may be measured from the hinge structure. The sensor 1035 may include state sensors at such points that the state sensors are brought into proximity to each other by the bending or the folding of the housing of the electronic device 100, and thus can sense the bending state or the folding state. The state sensor may include at least one of a near field sensor, an illumination sensor, a magnetic sensor, a hall sensor, a touch sensor, a bending sensor and an infrared sensor, or a combination of the above. The sensor 1035 may sense the position of the folding line which serves as a reference for the bending or the folding of the housing.

The communicator 1040 may communicate with various types of external devices according to various manners of communication. The communicator 1040 may include at least one of a WiFi chip 1041, a Bluetooth chip 1042, a wireless communication chip 1043, and a near field communication (NFC) chip 1044. The processor 1010 may transmit and receive calls and messages to and from various external devices by using the communicator 1040.

The WiFi chip 1041 and the Bluetooth chip 1042 may perform communication according to WiFi and Bluetooth schemes, respectively. When using the WiFi chip 1041 or the Bluetooth chip 1042, various connecting information such as service set identifier (SSID), session key, and so on may be first transmitted and received, so that connection for communication may be made by using the same for the transmission and reception of various data. The wireless communication chip 1043 refers to a chip that performs communication according to the various communication standards such as institute of electrical and electronics engineers (IEEE), Zigbee, 3rd generation (3G), 3rd generation partnership project (3GPP), and long term evolution (LTE). The NFC chip 1044 refers to a chip that operates in an NFC scheme, using 13.56 MHz bandwidth among various radio frequency (RF)-ID frequency bandwidths such as 135 kHz, 13.56 MHz, 433 MHz, 860~960 MHz, 2.45 GHz, and so on.

The video processor 1060 may process content received through the communicator 1040 or the video data included in the content stored in the memory 1030. The video processor 1060 may perform various image-processing regarding the video data, such as decoding, scaling, noise-filtering, frame rate converting, resolution conversion, and so on.

The audio processor 1065 may process content received through the communicator 1040 or the audio data included in the content stored in the memory 1030. The audio processor 1065 may perform various processing regarding the audio data, such as decoding, amplifying, noise filtering, and so on.

The processor 1010 may drive the video processor 1060 and the audio processor 1065 to play back the corresponding content, when the play-back program regarding the multimedia content is implemented. The speaker 1080 may output the audio data generated at the audio processor 1065.

The input unit 1050 may receive various commands from a user. The input unit 1050 may include at least one of a key 1051, the touch panel 1052 and the pen recognition panel 1053.

The touch panel 1052 may sense a user gesture, and output an event value corresponding to the sensed gesture. The touch panel 1052 may receive a user gesture including at least one of a hovering gesture, a tap gesture, a touch and hold gesture, a double tap gesture, a drag gesture, a panning gesture, and a flick gesture. In the case of a touch screen (not illustrated) combining the touch panel 1052 with the display panel 1021, the touch screen may be realized with various types of touch sensors such as capacitive sensors, resistive sensors, piezoelectric sensors, and the like.

The capacitive type uses a dielectric material coated on the surface of the touch screen, and senses the micro electricity excited by part of the user body as it touches on the surface of the touch screen and calculates a touch coordinate. The resistive type includes two electrode plates embedded within the touch screen, and senses an electric current flow as the user touches on the screen and the upper and the lower plates at the touched point are brought into contact each other, and calculates a touch coordinate. The touch event generated on the touch screen may be generated by the human finger mainly, although the touch event may also be generated by a conductive material that can cause capacitance changes.

The key 1051 may include various forms of keys such as mechanical buttons and wheels formed on various areas such as front, side, and back, of the exterior main body of the electronic device 100.

The pen recognition panel 1053 may sense a pen approaching input or a pen touch input according to a maneuvering of the user touch pen (e.g., stylus pen, digitizer pen), and output the sensed pen approaching event or pen touch event. The pen recognition panel 1053 may be implemented so as to accommodate the active manner or the passive manner according to an inputting manner of the touch pen. The active manner involves embedding a battery or a coil within the touch pen, in which the pen recognition panel 1053 can sense a touch or approaching according to changes in the magnitude of the electromagnetic field as these are caused in response to the approaching or the touching. The passive manner involves sensing approaching or touch input of a touch pen, by using the conductive property of the touch pen itself and without separately providing an internal element.

For example, the active manner may include an EMR manner. In this case, a pen recognition panel 1053 may include an electromagnetic induction coil sensor (not illustrated) having a grid structure, and an electromagnetic signal processor (not illustrated) providing an alternating current (AC) signal of a predetermined frequency to respective loop coils of the electromagnetic induction coil sensor in a sequential order. When a pen with a resonance circuit embedded therein is present in the vicinity to the loop coils of the pen recognition panel 1053, the magnetic field transmitted from the corresponding loop coils generates electric current at the resonance circuit within the pen based on the mutual electromagnetic induction. Based on this current, an induction field is generated from the coils of the resonance circuit within the pen, and the pen recognition panel 1053 detects this induction field from the loop coil in a signal reception state. Accordingly, the approaching position or touching position of the pen may be sensed. The pen recognition panel 1053 may be provided on a lower portion of the display panel 1021, while having a predetermined area that can cover a display area of the display panel 1021, for example.

The microphone 1070 may receive an input of the user voice or other sounds and convert into audio data. The processor 1010 may use the user voice inputted through the microphone 1070 for a call operation, or convert it into the audio data and store in the memory 1030.

The camera 1075 may photograph still image or video according to controlling of a user. The cameras 1075 may be implemented as a plurality of cameras such as a front camera and a rear camera.

When the camera 1075 and the microphone 1070 are provided, the processor 1010 may perform controlling operation according to the user voice inputted through the microphone 1070 or the user motion recognized by the camera 1075. For example, the electronic device 100 may operate in a motion control mode or a voice control mode. When operating in the motion control mode, the processor 1010 may photograph a user by activating the camera 1075, track the change in the user motion, and perform controlling operations accordingly. When operating in the voice control mode, the processor 1010 may analyze the user voice inputted through the microphone 1070, and perform controlling operation according to the analyzed user voice.

The motion sensor 1085 may sense the movement of the main body of the electronic device 100. The electronic device 100 may rotate or tilt in various directions. The motion sensor 1085 may sense motion characteristics such as rotating direction, angle, inclination, and so on, by using at least one of various sensors such as geomagnetic sensor, gyro sensor, acceleration sensor, and so on.

Although not illustrated in FIG. 16, the electronic device 1000 may include a universal serial bus (USB) port that can be connected to a USB connector, various external input ports that can connect to various external components such as headset, mouse and local area network (LAN), digital multimedia broadcasting (DMB) chip which receives and processes DMB signals, other various sensors, and the like.

The constituent elements of the electronic device 100 described above may be named differently. Further, the electronic device 100 according to an embodiment may be configured by including at least one of the constituent elements described above, and some of the constituent elements may be omitted or another additional constituent element may be added.

The processor 1010 of FIG. 16 may correspond to the processor 120 of FIG. 4, and the sensor 1035 of FIG. 16 may correspond to the state sensor 110 of FIG. 4. The display 1020 of FIG. 16 may be combined with at least one of the touch panel 1052 and the pen recognition panel 1053 of FIG. 16, which may correspond to the display 130 of FIG. 4.

Figure 17:
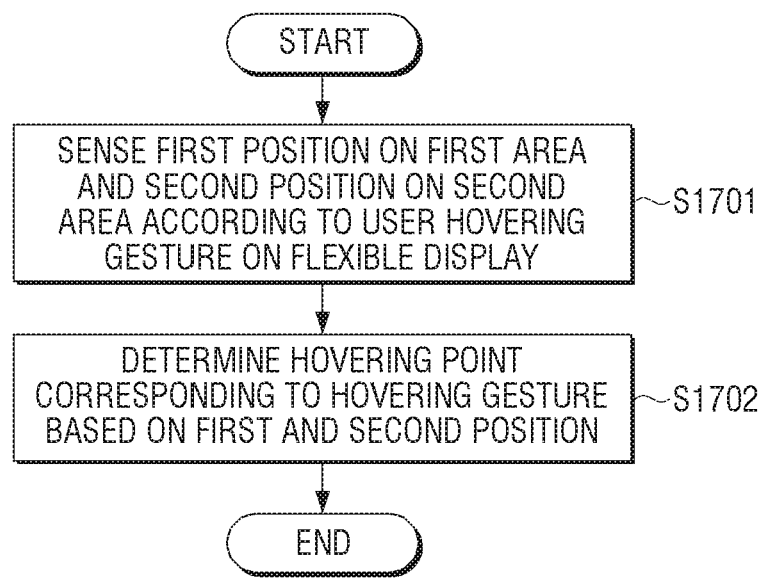
FIGS. 17 and 18 are flowcharts of a method of an electronic device for processing a gesture according to an embodiment of the present disclosure.

FIG. 17 is a flowchart of a method of an electronic device for processing a user gesture according to an embodiment of the present disclosure.

Referring to FIG. 17, at operation S1701, the electronic device 100 may sense the first position in the first area and the second position in the second area according to the hovering gesture of a user on the flexible display.

At operation S1702, the electronic device 100 may determine a hovering point corresponding to the hovering gesture based on the sensed, first and second positions.

Figure 18:
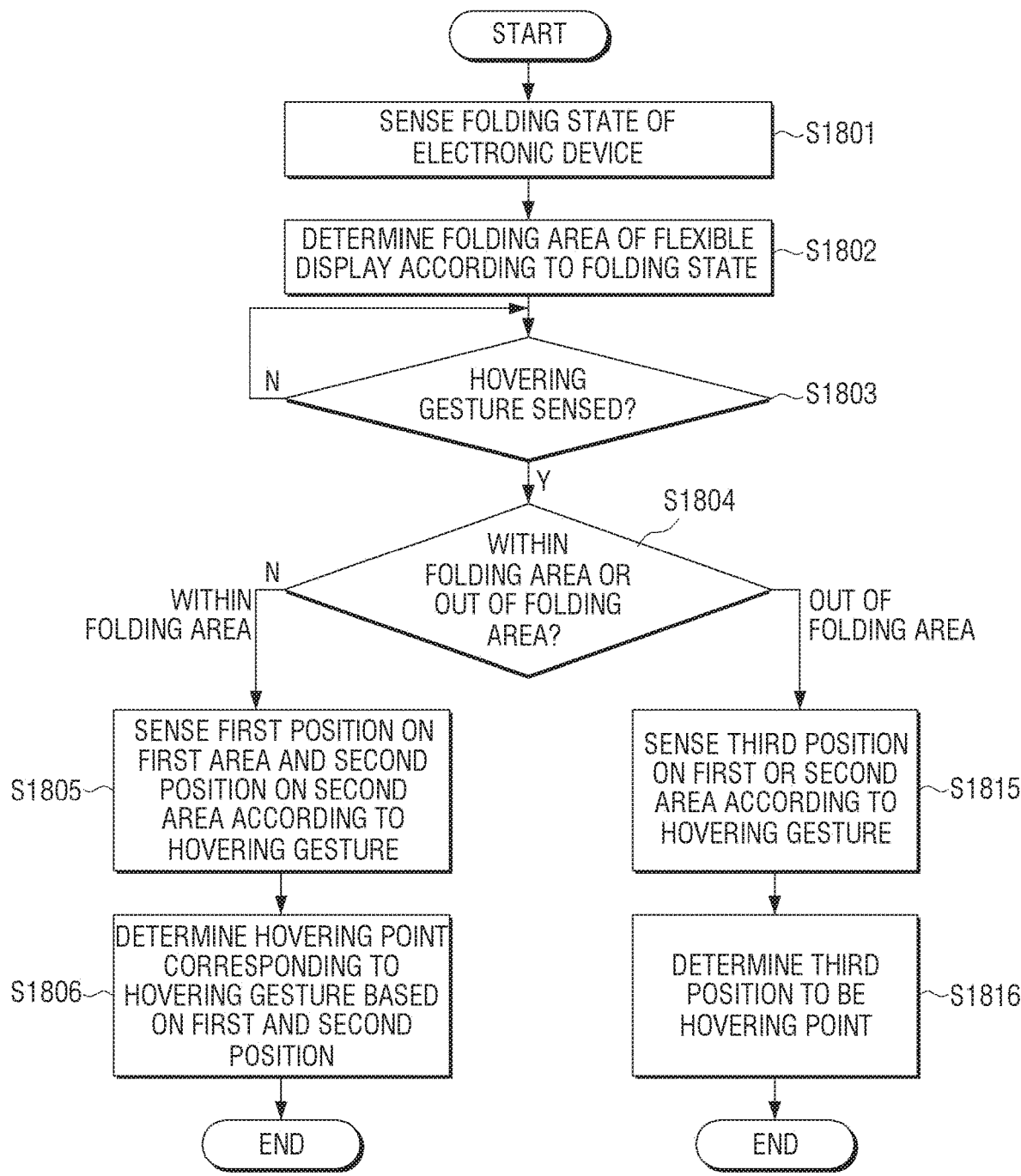

FIG. 18 is a flowchart of a method of an electronic device for processing a user gesture according to an embodiment of the present disclosure.

Referring to FIG. 18, at operation S1801, the electronic device 100 may sense the folding state of the electronic device 100. The folding state may be in-bending state in which the electronic device 100 is bent inward, or out-bending state in which the electronic device 100 is bent outward.

At operation S1802, the electronic device 100 may determine the folding area of the flexible display according to the folding state of the electronic device 100. The folding area may increase as the folding angle of the electronic device 100 increases. For example, the folding area may increase linearly or non-linearly in proportional to the increasing of the folding angle. As the folding angle increases, the folding area may increase in stages based on threshold values.

At operation S1803, the electronic device 100 may determine if the hovering gesture of a user is sensed.

When the hovering gesture of a user is sensed at operation S1803, the electronic device 100 may determine whether the hovering gesture of a user is performed within the folding area or outside the folding area, at operation S1804.

When the hovering gesture is determined to be performed within the folding area the folding area, at operation S1804, the electronic device 100 may sense the first hovering position in the first area and the second hovering position in the second area according to the hovering gesture, at operation S1805. At operation S1806, the electronic device 100 may determine a hovering point corresponding to the hovering gesture based on the first and second hovering positions.

When the hovering gesture is determined to be performed outside the folding area, at operation S1804, the electronic device 100 may sense the third hovering position in the first or the second area according to the hovering gesture, at operation S1815. At operation S1816, the electronic device 100 may determine the sensed third hovering position to be hovering point.

FIGS. 19A to 20B are views of a screen of an electronic device displaying a UI on a folding area according to an embodiment of the present disclosure.

Figure 19A:
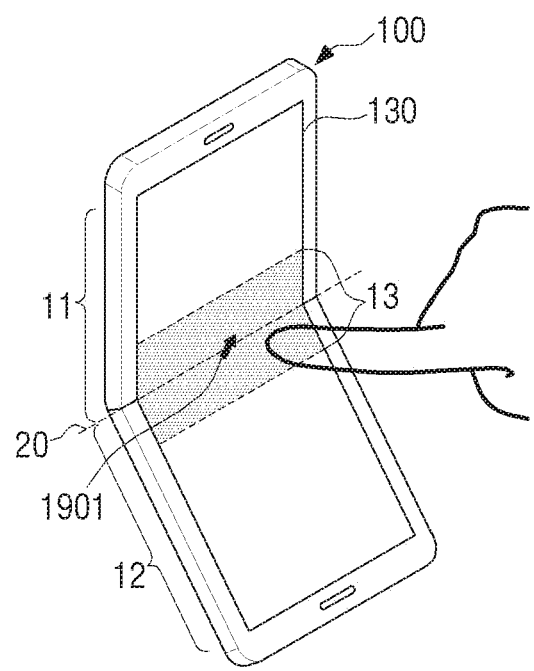
FIGS. 19A to 20B are views of a screen of an electronic device displaying a user interface (UI) on a folding area according to an embodiment.
Figure 19B:
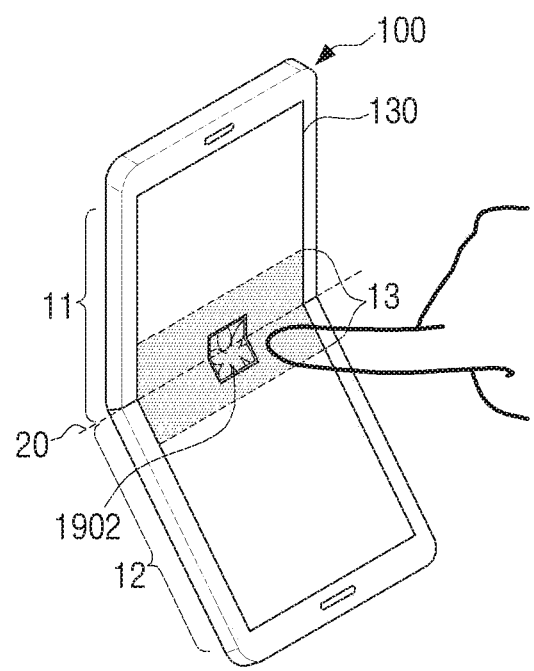

Referring to FIGS. 19A and 19B, the electronic device 100 may be in an in-bending state in which the device 100 is bent inward. In this state, the processor 120 may sense at least one hovering position on the folding area 13 according to the hovering gesture of a user on the folding area 13 of the flexible display 130. The processor 120 may determine a hovering point corresponding to the hovering gesture with the methods described above, based on at least one sensed hovering position.

For example, from the flexible display 130 divided into a first area 11 and a second area 12 based on the folding line 20, the processor 120 may sense the first position in the first area 11 and the second position in the second area 12 according to the hovering gesture of a user. The processor 120 may determine a hovering point corresponding to the hovering gesture based on the sensed first and second positions.

The processor 120 may sense at least one position on the folding area according to the hovering gesture of a user. The processor 120 may determine a hovering point corresponding to the hovering gesture by correcting the sensed position. In this case, the processor 120 may control the flexible display 130 to display a UI on the hovering point determined from the folding area 13.

For example, as illustrated in FIG. 19A, the processor 120 may control the flexible display 130 to newly display an indicator 1901 (e.g., cursor, pointer, and insertion marker) representing the position designated by a user, or move the indicator from other position and display the same. As illustrated in FIG. 19B, the processor 120 may control the flexible display 130 to newly display an item 1902 interactive with a user (e.g., icon, content, etc.), or move the item from other position and display. In this case, the flexible display 130 may display the item 1902 so that the center area of the item 1902 is positioned on the hovering point, or so that one side or one edge of the item 1902 (e.g., upper-left position of the item) is positioned on the hovering point. When the item 1902 is displayed, a user may input the touch gesture to select the item. The processor 120 may sense the touch gesture to select the item 1902 on the folding area 13. When the touch gesture of a user is sensed, the processor 120 may perform function corresponding to the selected item 1902.

Figure 20A:
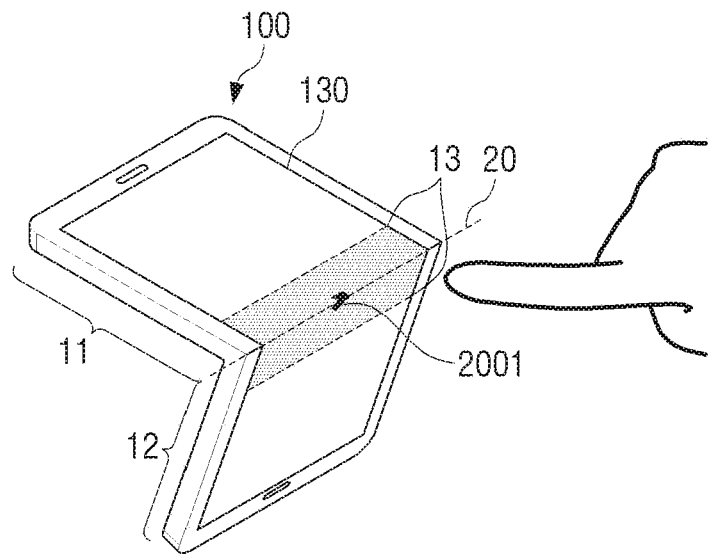
Figure 20B:
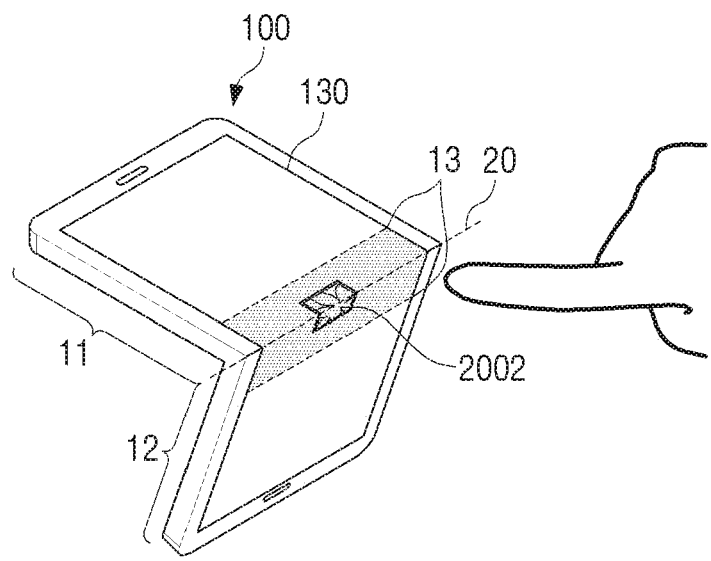

Referring to FIGS. 20A and 20B, the electronic device 100 may be in an out-bending state in which the device is bent outward. In this state, when the hovering gesture of a user is inputted on the folding area 13 of the flexible display 130, the processor 120 may sense at least one hovering position on the folding area 13. Next, the processor 120 may determine a hovering point corresponding to the hovering gesture based on at least one sensed hovering position, and control the flexible display 130 to display the UI on the determined hovering point.

For example, as illustrated in FIG. 20A, the processor 120 may control the flexible display 130 to newly display the indicator 2001 representing the position designated by a user, or move the indicator from other position and display. As illustrated in FIG. 20B, the processor 120 may control the flexible display to newly display the item 2002 interactive with a user, or move the item from other position and display the same. In this case, the flexible display 130 may display the item so that the center area of the item 2002 can be positioned on the hovering point, or so that one side or one edge of the item 2002 (e.g., the upper-left position of the item) is positioned on the hovering point. When the item 2002 is displayed, the processor 120 may sense the touch gesture of a user to select the item 2002 on the folding area 13. In response to the touch gesture of a user, the processor 120 may perform function corresponding to the selected item 2002.

Figure 21A:
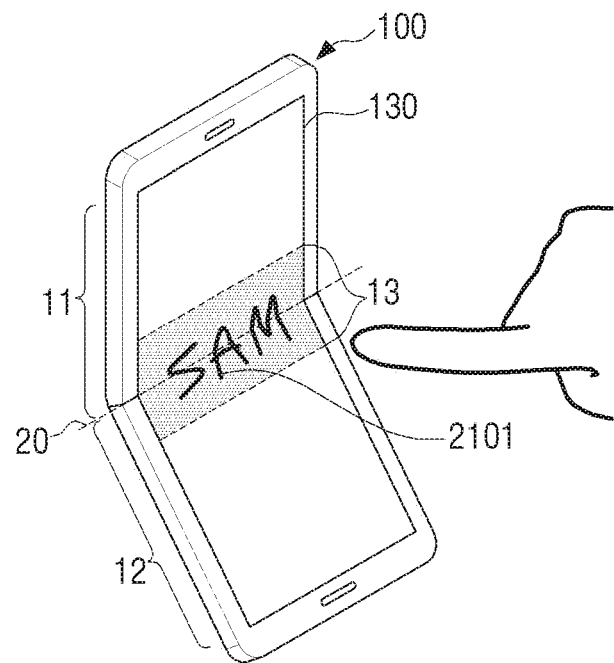
FIGS. 21A and 21B are views of a screen of an electronic device displaying a drawing or handwriting on a folding area according to an embodiment of the present disclosure.
Figure 21B:
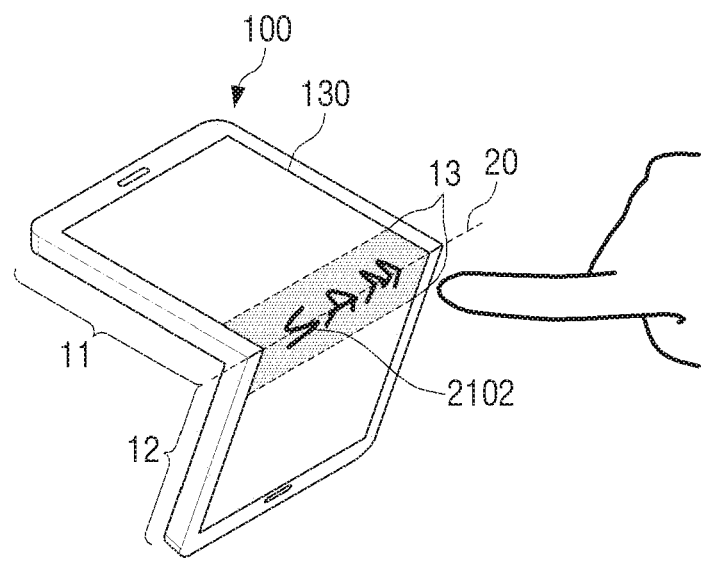

FIGS. 21A and 21B are views of a screen of an electronic device displaying a drawing or handwriting on a folding area according to an embodiment of the present disclosure.

Referring to FIG. 21A, the electronic device 100 may be in an in-bending state in which the device is bent inward. In this state, the processor 120 may sense a plurality of hovering positions on the folding area 13 according to the movement of the hovering gesture of a user who draws or writes on the folding area 13 of the flexible display 130. The processor 120 may determine a plurality of hovering points corresponding to the hovering gesture with the methods described above, based on a plurality of sensed hovering positions. The processor 120 may control the flexible display 130 to display the drawing result or the handwriting result 2101 on the folding area 13 according to the determined hovering points. When the determined hovering points are discrete, the processor 120 may control the flexible display 130 to connect the determined hovering points and display the consecutive drawing result or handwriting result.

Referring to FIG. 21B, the electronic device 100 may be in an out-bending state in which the device is bent outward. In this state, the processor 120 may sense a plurality of hovering positions on the folding area 13 according to the hovering gesture of a user who draws or writes on the folding area 13 of the flexible display 130, and determine a plurality of hovering points corresponding to the hovering gesture based on a plurality of sensed hovering positions. The processor 120 may control the flexible display 130 to display the drawing result or the handwriting result 2102 on the folding area 13 according to the determined hovering points.

FIGS. 22A to 23C are views of a screen of an electronic device selecting an item displayed on a folding area according to an embodiment of the present disclosure.

Figure 22A:
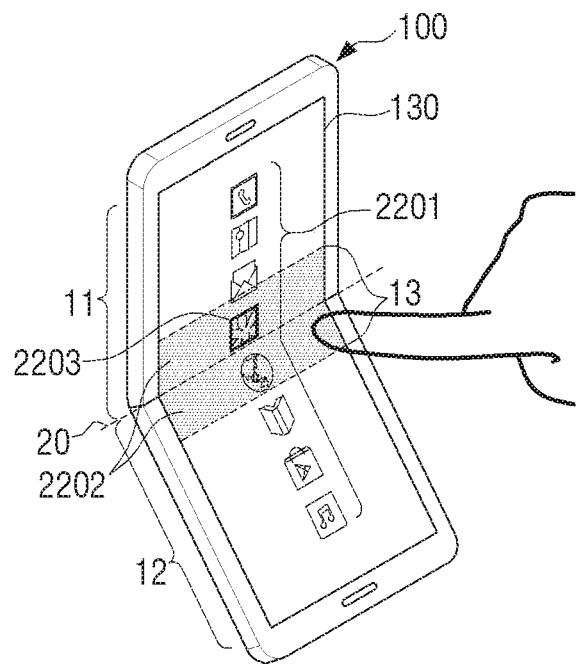
Figure 22B:
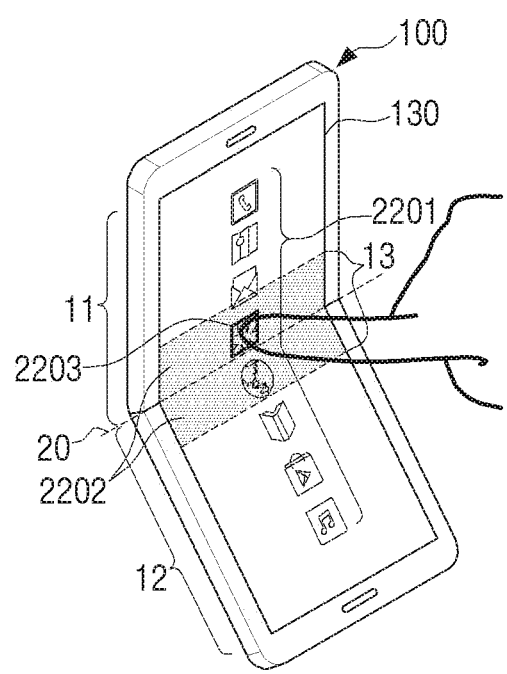
Figure 22C:
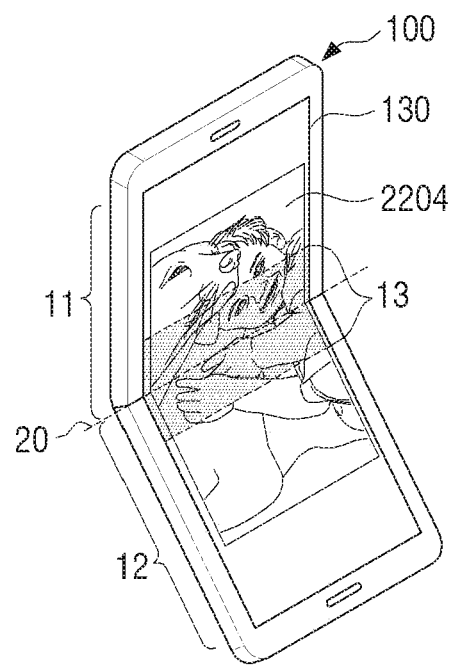

Referring to FIGS. 22A to 22C, the electronic device 100 may be in an in-bending state in which the device is bent inward. In this state, referring to FIG. 22A, the processor 120 may control the flexible display 130 to display a plurality of items 2201 (e.g., icons, content, and so on). At least a portion 2202 of a plurality of items 2201 may be positioned in the folding area 13. When the hovering gesture is inputted on the folding area 13, the processor 120 may determine a hovering point corresponding to the hovering gesture in the folding area 13 according to the hovering gesture. The processor 120 may control the flexible display 130 to display the item 2203 positioned on the hovering point in highlighting.

When a user performs touch to select the highlighted item 2203, the processor 120 may sense the user touch gesture to select the highlighted item 2203, as illustrated in FIG. 22B.

In response to the user touch gesture, the processor 120 may display the application implementing screen 2204 corresponding to the selected item 2203, as illustrated in FIG. 22C.

According to another embodiment of the present disclosure, referring to FIGS. 23A to 23C, the electronic device 100 may be in an out-bending state in which the device is bent outward. In this state, referring to FIG. 23A, the processor 120 may control the flexible display 130 to display a plurality of items 2301. At least a portion 2302 of a plurality of items 2301 may be positioned in the folding area 13. In this case, the processor 120 may determine a hovering point corresponding to the hovering gesture in the folding area 13, according to the hovering gesture on the folding area 13. The processor 120 may control the flexible display 130 to highlight the item 2303 positioned on the hovering point.

Referring to FIG. 23B, the processor 120 may sense the user touch gesture to select the highlighted item 2303. In response to the user touch gesture, the processor 120 may display the application implementing screen 2304 corresponding to the selected item 2303, as illustrated in FIG. 23C.

FIGS. 24A to 25B are views provided to explain a method of an electronic device for recognizing a movement of a hovering point according to an embodiment of the present disclosure.

Figures 24A, 24B:
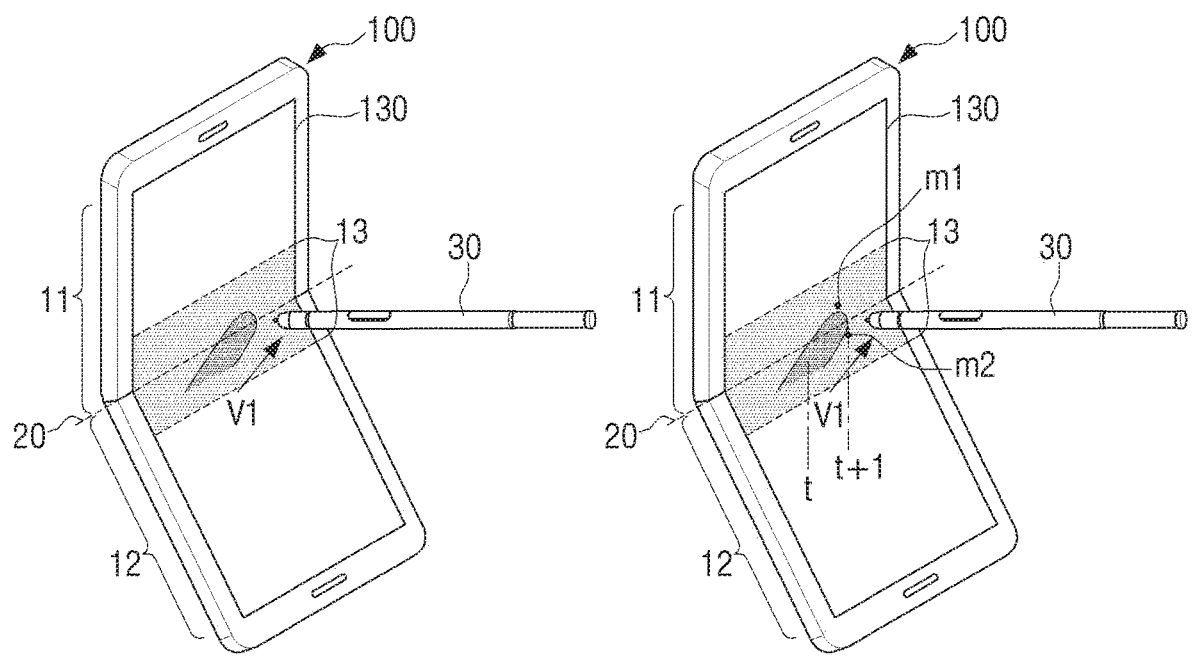

Referring to FIG. 24A, the electronic device 100 may be in an in-bending state in which the device is bent inward. In this circumstance, the processor 120 may sense a hovering gesture of a user who moves on the folding area 13 of the flexible display 130 by using the inputting means 30. In this case, the processor 120 may determine a plurality of hovering points in the folding area 13, according to the movement of the hovering gesture. The processor 120 may determine a plurality of hovering gestures corresponding to the hovering gesture, based on a plurality of sensed hovering positions.

The processor 120 may determine the moving direction (v1) of the hovering gesture based on the trajectory of the hovering points determined over time.

The processor 120 may determine the moving direction (v1) of the hovering gesture based on the motion characteristic of the inputting means 30. For example, the motion characteristic of the inputting means 30 such as inclination, acceleration or moving direction may be sensed with the value measured in the sensor equipped in the inputting means 30. The processor 120 may determine the moving direction (v1) of the hovering gesture based on at least one of a plurality of hovering points and the motion characteristics according to the movement of the user hovering gesture.

The processor 120 may selectively use the motion characteristics of the inputting means 30 in order to determine the moving direction (v1) of the hovering gesture. For example, the processor 120 may usually determine the moving direction (v1) of the hovering gesture based on the trajectory of a plurality of hovering points. However, when the values measured by the electrodes according to the hovering gesture respectively sensed in the first area 11 and the second area 12 based on the folding line 20 are the same or almost the same as one another (e.g., when the measured values are within a certain range), the processor 120 may determine the moving direction of the hovering gesture by using the motion characteristic of the inputting means 30.

For example, referring to FIG. 24B, when the values (m1, m2) measured in the first area 11 and the second area 12 according to the hovering gesture at time point t+1 are the same or almost the same as each other, the processor 120 may determine one measured value (m1) among the measured values according to the hovering gesture to be hovering point corresponding to the moved hovering gesture based on the motion characteristic of the inputting means 30. The processor 120 may determine the moving direction (v1) of the hovering gesture based on the hovering point determined at time point t and another hovering point determined at time point t+1.

Figure 25A:
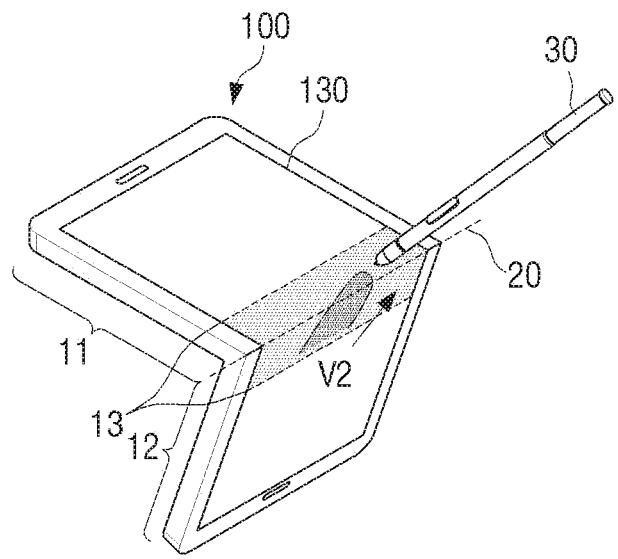

Referring to FIG. 25A, the electronic device 100 may be in an in-bending state in which the device 100 is bent inward. In this circumstance, the processor 120 may sense a hovering gesture of a user who moves on the folding area 13 of the flexible display 130 by using the inputting means 30. In this case, the processor 120 may determine a plurality of hovering points in the folding area 13, according to the movement of the hovering gesture. The processor 120 may determine a plurality of hovering gestures corresponding to the hovering gesture, based on a plurality of sensed hovering positions.

The processor 120 may determine the moving direction (v2) of the hovering gesture based on the trajectory of the hovering points determined over time.

The processor 120 may determine the moving direction of the hovering gesture based on the motion characteristic of the inputting means 30.

Figure 25B:
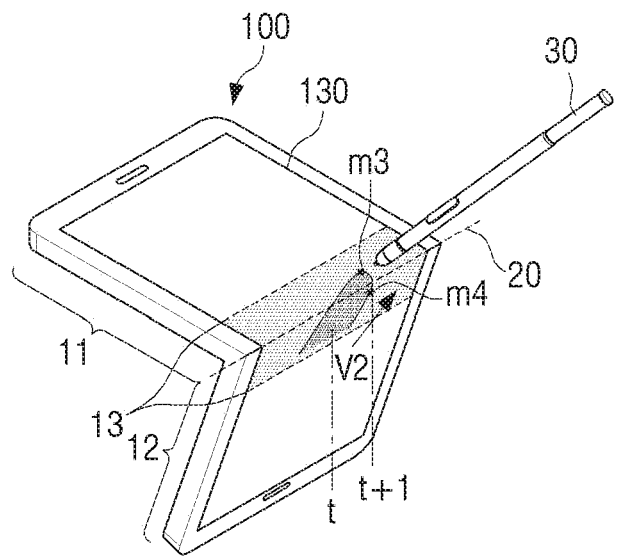

Referring to FIG. 25B, when the values (m3, m4) measured in the first area 11 and the second area 12 according to the hovering gesture at time point t+1 are the same or almost the same as each other, the processor 120 may determine one measured value (m3) among the measured values according to the hovering gesture to be hovering point corresponding to the moved hovering gesture based on the motion characteristic of the inputting means 30. The processor 120 may determine the moving direction (v2) of the hovering gesture based on the hovering point determined at time point t and another hovering point determined at time point t+1.

FIGS. 26A to 27B are views of a screen of an electronic device displaying a UI in response to a movement of a hovering gesture according to an embodiment of the present disclosure.

Figures 26A, 26B:
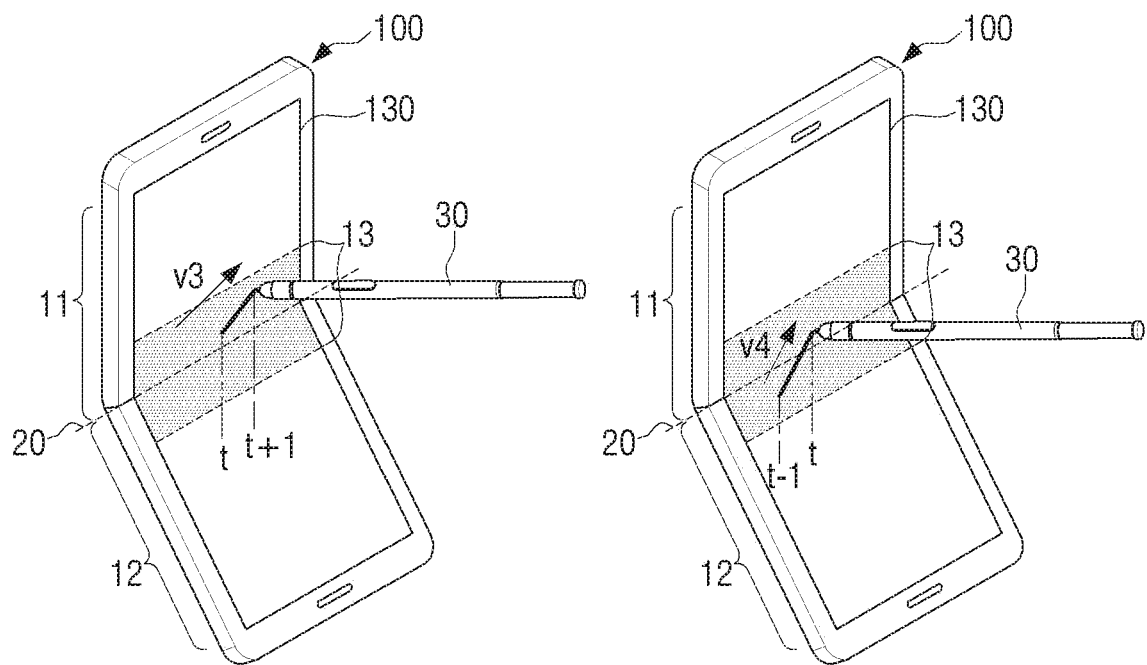

Referring to FIGS. 26A and 26B, the electronic device 100 may be in an in-bending state in which the device 100 is bent inward. In this circumstance, the processor 120 may sense a hovering gesture of a user who moves on the folding area 13 of the flexible display 130 by using the inputting means 30. In this case, the processor 120 may determine a plurality of hovering points in the folding area 13, according to the movement of the hovering gesture. The processor 120 may determine a plurality of hovering points corresponding to the hovering gesture with the methods described above, based on a plurality of sensed hovering positions.

The processor 120 may determine the moving direction of the hovering gesture based on at least one of a plurality of hovering points and the motion characteristics with the methods described above with reference to FIGS. 24A to 25B.

The processor 120 may display the UI or the graphic on the position corresponding to the moved hovering gesture based on the determined moving direction of the hovering gesture.

For example, as illustrated in FIG. 26A, when the hovering gesture is moved toward a certain direction (v3), the processor 120 may determine a hovering point corresponding to the hovering gesture at time point t. The processor 120 may wait until time point t+1 and determine the moving direction of the hovering gesture from time point t to time point t+1. For example, the moving direction of the hovering gesture may be a vector direction from the hovering point determined at time point t to the hovering point determined at time point t+1. The processor 120 may display a UI or the graphic indicating the moving trajectory of the hovering gesture at time point t+1 based on the moving direction of the hovering gesture. In this case, the time delay (t+1)−(t) may be generated since performing of the hovering gesture until the displaying of UI or the graphic. However, the UI or the graphic may be displayed on the position where the intention of the user performing the hovering gesture is correctly reflected.

Referring to FIG. 26B, when the hovering gesture is moved toward a certain direction (v4), the processor 120 may determine a hovering point corresponding to the hovering gesture at time point t. The processor 120 may determine the moving direction of the hovering gesture based on the history of the hovering point. For example, the moving direction of the hovering gesture may be vector direction from the hovering point determined at time point t−1 to the hovering point determined at time point t. The processor 120 may display a UI indicating the moving trajectory of the hovering gesture at time point t based on the moving direction of the hovering gesture. In this case, because the history of the hovering point in which the hovering gesture is previously performed is used without using additional waiting time, the time delay from performing of the hovering gesture until displaying of the UI or the graphic can be minimized.

The methods described above with reference to FIGS. 26A and 26B may be combined. For example, when the hovering gesture is moved toward a certain direction, the processor 120 may display the UI or the graphic on the positions corresponding to the moved hovering gesture by using the method in FIG. 26A until the history of the moved hovering point is accumulated for a certain time (e.g., 0.5 sec to 2 sec) or longer. When the history of the hovering point is accumulated for a certain time or longer, the processor 120 may display the UI or the graphic on the positions corresponding to the moved hovering gesture by using the method in FIG. 26B.

When the hovering gesture is moved toward a certain direction, the processor 120 may determine the moving direction of the hovering gesture based on the motion characteristic of the inputting means 30 performing the hovering gesture. For example, the processor 120 may obtain the measured values related with the inclination direction of the inputting means 30, and determine the moving direction of the hovering gesture based on the obtained values. The processor 120 may display the UI or the graphic indicating the moving trajectory according to the hovering gesture based on the moving direction of the hovering gesture.

The hovering gesture may be moved to the folding area 13 from the first area 11 or the second area 12 which are outside the folding area 13 based on the folding line 20. In this case, the processor 120 may display the UI or the graphic indicating the moving trajectory according to the movement of the hovering gesture on the folding area 13 based on the moving direction of the hovering gesture determined in the first area 11 or the second area 12 which are outside the folding area 13. For example, based on the moving direction of the hovering gesture determined in the first area 11 which is outside the folding area 13, the processor 120 may display the UI or the graphic indicating the moving trajectory of the hovering gesture on the folding area 13 to be positioned on the extended line of the moving direction.

Figure 27A:
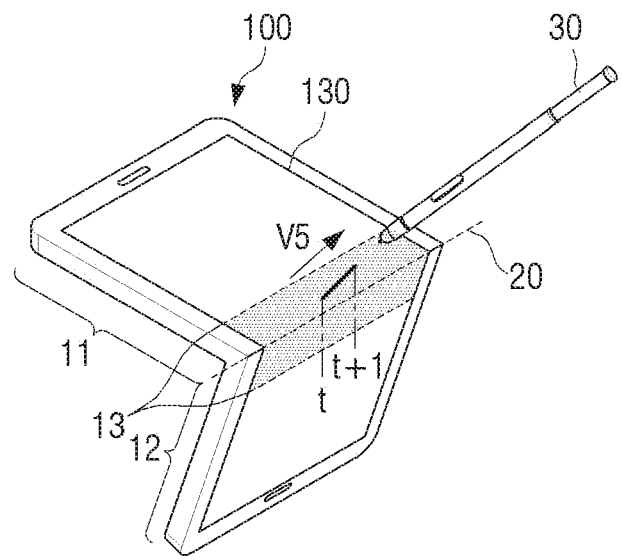
Figure 27B:
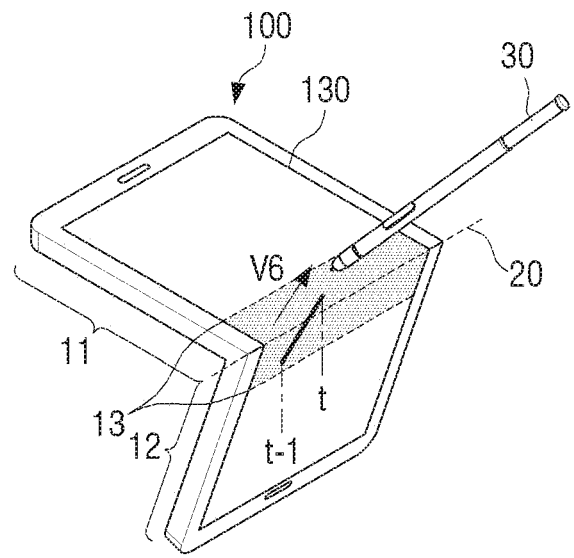

Referring to FIGS. 27A and 27B, the electronic device 100 may be in the out-bending state in which the device is bent outward. In this case, the processor 120 may sense a hovering gesture of a user who moves on the folding area 13 of the flexible display 130 by using the inputting means 30. The processor 120 may determine a plurality of hovering points in the folding area 13, according to the movement of the hovering gesture. The processor 120 may determine a plurality of hovering points corresponding to the hovering gesture with the methods described above, based on a plurality of sensed hovering positions.

The processor 120 may determine the moving direction of the hovering gesture based on at least one of a plurality of hovering points and motion characteristics, and display a UI or a graphic on the positions corresponding to the hovering gesture in motion, based on the determined moving direction.

For example, as illustrated in FIG. 27A, when the hovering gesture is moved toward a certain direction (v5), the processor 120 may determine a hovering point corresponding to the hovering gesture at time point t. The processor 120 may wait until time point t+1 and determine the moving direction of the hovering gesture from time point t to time point t+1. The processor 120 may display the UI or the graphic indicating the moving trajectory of the hovering gesture at time point t based on the moving direction of the hovering gesture.

Referring to FIG. 27B, when the hovering gesture is moved toward a certain direction (v6), the processor 120 may determine a hovering point corresponding to the hovering gesture at time point t. The processor 120 may determine the moving direction of the hovering gesture based on the history of the hovering point. For example, the moving direction of the hovering gesture may be vector direction from the hovering point determined at time point t−1 to the hovering point determined at time point t. The processor 120 may display the UI or the graphic indicating the moving trajectory of the hovering gesture at time point t based on the moving direction of the hovering gesture.

The methods described above with reference to FIGS. 27A and 27B may be combined. For example, until the history of the moved hovering points is accumulated for more than a certain time, the UI or the graphic may be displayed on the position corresponding to the moved hovering gesture by using the method in FIG. 27A. When the history of the hovering point is accumulated for a certain time or longer, the processor 120 may display the UI or the graphic on the positions corresponding to the moved hovering gesture by using the method in FIG. 27B.

Figure 28:
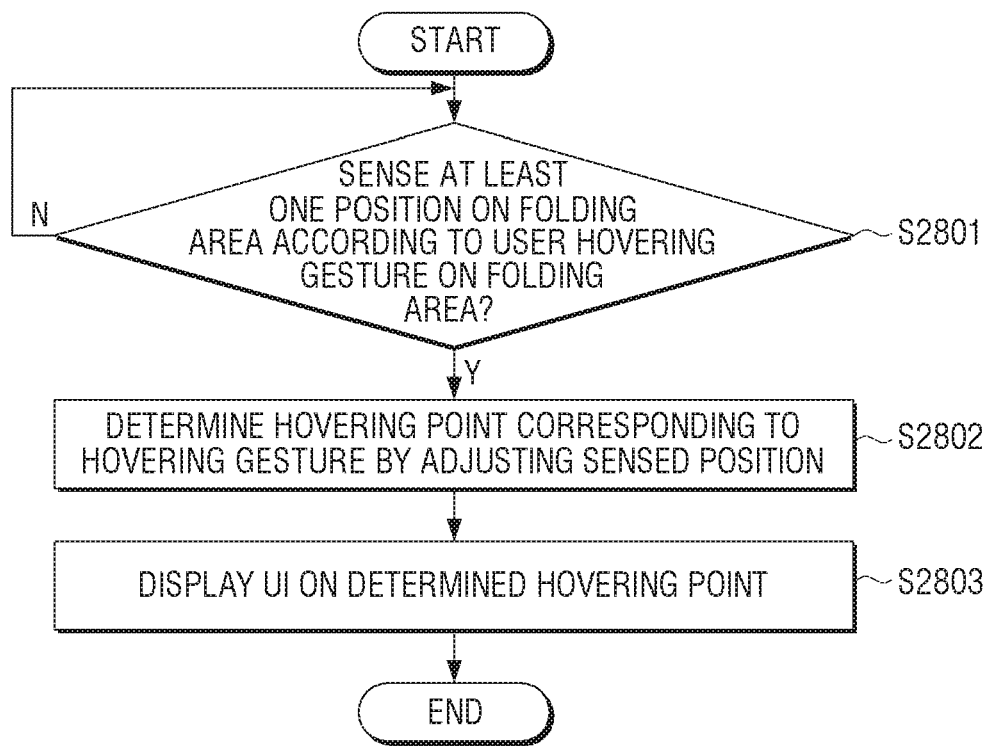
FIGS. 28 to 30 are flowcharts of a method of an electronic device for processing a gesture according to an embodiment of the present disclosure.

FIG. 28 is a flowchart provided to explain a method of an electronic device 100 for processing a user gesture according to another embodiment of the present disclosure.

At operation S2801, the electronic device 100 may determine if at least one hovering position is sensed on the folding area 13 according to the user hovering gesture on the folding area 13 including the folding line 20.

At operation S2802, when the hovering position is sensed, the electronic device 100 may determine a hovering point corresponding to the hovering gesture by correcting the sensed hovering position.

At operation S2803, the electronic device 100 may display the UI or the graphic on the determined hovering point.

Figure 29:
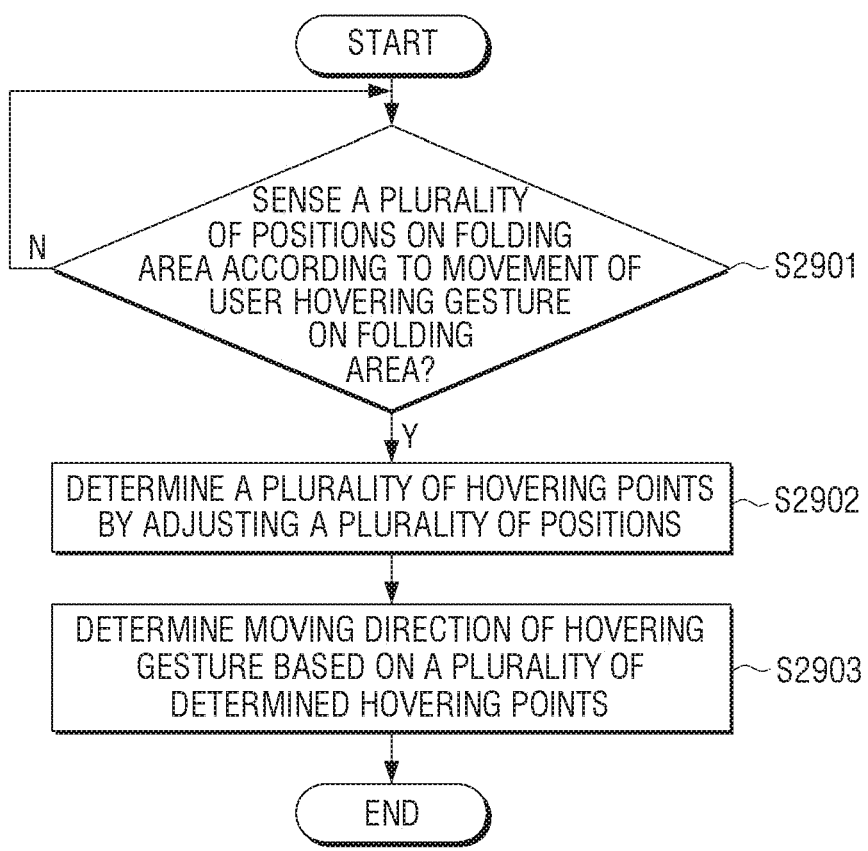

FIG. 29 is a flowchart provided to explain a method of an electronic device for processing a user gesture according to an embodiment of the present disclosure.

At operation S2901, the electronic device 100 may determine if a plurality of hovering positions are sensed on the folding area 13 according to the user hovering gesture on the folding area 10 including the folding line 20.

At operation S2902, the electronic device 100 may determine a plurality of hovering points by correcting a plurality of hovering positions.

At operation S2903, the electronic device 100 may determine the moving direction of the hovering gesture based on a plurality of determined hovering points. In this case, the electronic device 100 may display UI or the graphic indicating the moving trajectory of the hovering gesture according to the moving direction of the hovering gesture.

Figure 30:
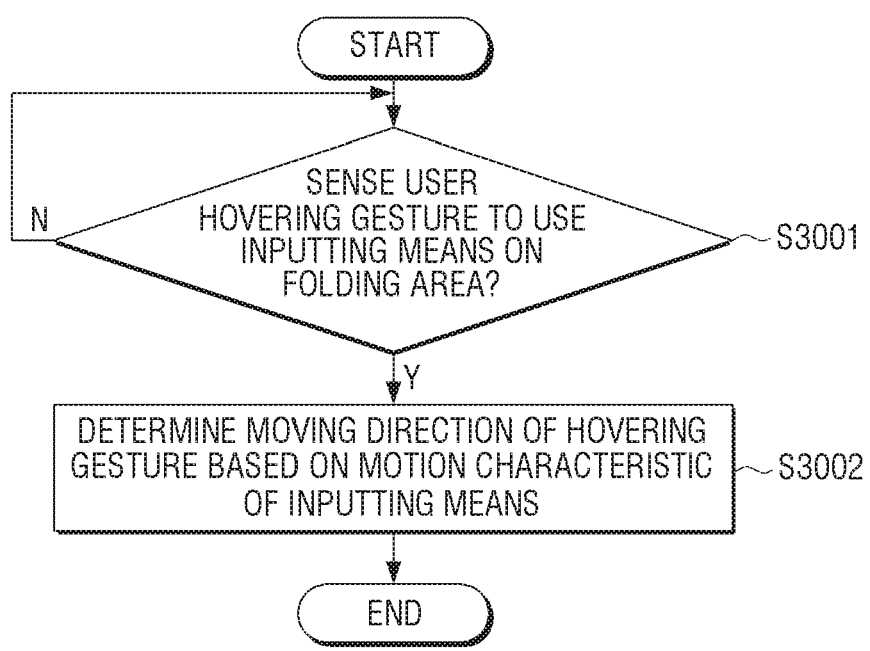

FIG. 30 is a flowchart provided to explain a method of an electronic device for processing a user gesture according to an embodiment of the present disclosure.

At operation S3001, the electronic device 100 may sense the hovering gesture of a user using the inputting means on the folding area 13.

At operation S3002, when the motion characteristic of the inputting means is sensed, the electronic device 100 may determine the moving direction of the hovering gesture based on the motion characteristic of the inputting means.

The various embodiments and all of the function operations described herein may be implemented within a digital electronic circuit, or within a computer software, firmware, or hardware comprising the structures achieved herein or equivalent structures of these, or a combination of one or more of these.

A non-transitory computer readable recording medium may be an arbitrary available medium storing that is accessible by a computer, and the computer readable recording medium encompasses a volatile and non-volatile medium, removable and non-removable medium. Further, the non-transitory computer readable recording medium may encompass a computer recording medium and communication medium. The computer recording medium encompasses volatile and non-volatile, removable and non-removable medium that is realized with an arbitrary method or technology for the storage of information such as computer readable commands, data structure, program modules or other data. The communication medium includes computer readable commands, data structure, program module, or other data of the modified data signal.

The foregoing various embodiments and advantages are not to be construed as limiting the various embodiments. The present teaching can be readily applied to other types of apparatuses. Also, the description of the various embodiments of the present disclosure is intended to be illustrative, and not to limit the scope of the claims.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device for processing a gesture, the method comprising:
 in response to a hovering gesture to a flexible display of the electronic device being input while the flexible display is folded based on a folding line, wherein the flexible display is divided in response to folding of the electronic device into a first area and a second area based on the folding line, sensing a plurality of positions of the hovering gesture in each of the first area and the second area, respectively; and
 determining a hovering point corresponding to the hovering gesture, based on the plurality of sensed positions of the first area and the second area, respectively.

2. The method of claim 1, wherein the hovering gesture is performed in vicinity of a folding area comprising the folding line of the flexible display.

3. The method of claim 2, further comprising:
 sensing a folding state of the electronic device,
 wherein the folding area is determined according to the folding state of the electronic device.

4. The method of claim 3, wherein the folding state of the electronic device is one of:
 an in-bending state in which the electronic device is bent inward, or
 an out-bending state in which the electronic device is bent outward.

5. The method of claim 2, wherein a size of the folding area is increased as a folding angle of the electronic device is increased.

6. The method of claim 1, wherein the plurality of sensed positions in the first area correspond to a position of an electrode of electrodes in the first area for which a sensed value measured with respect to the hovering gesture has a peak point.

7. An electronic device comprising:
a flexible display dividable into a first area and a second area based on a folding line; and
a processor configured to, in response to a hovering gesture being input while the flexible is folded based on the folding line, sense a plurality of positions of the hovering gesture in each of the first area and the second area, respectively, and determine a hovering point corresponding to the plurality of positions of the hovering gesture based on the plurality of sensed positions in the first area and the second area, respectively.

8. The electronic device of claim 7, wherein the hovering gesture is performed in vicinity of a folding area comprising the folding line of the flexible display.

9. The electronic device of claim 8 further comprising:
a state sensor configured to sense a folding state of the electronic device,
wherein the processor determines the folding area according to the folding state.

10. The electronic device of claim 9, wherein the folding state of the electronic device is one of:
an in-bending state in which the electronic device is bent inward; or
an out-bending state in which the electronic device is bent outward.

11. The electronic device of claim 8, wherein a size of the folding area is increased as a folding angle of the electronic device is increased.

12. The electronic device of claim 7, wherein the plurality of sensed positions in the first area correspond to a position of an electrode of electrodes in the first area for which a sensed value measured according to the hovering gesture has a peak point.

* * * * *